United States Patent [19]

Kaliski

[11] Patent Number: 5,312,484
[45] Date of Patent: May 17, 1994

[54] TIO$_2$-CONTAINING COMPOSITE PIGMENT PRODUCTS

[75] Inventor: Adam F. Kaliski, East Windsor, N.J.

[73] Assignee: Industrial Progress, Inc., East Windsor, N.J.

[21] Appl. No.: 811,603

[22] Filed: Dec. 23, 1991

Related U.S. Application Data

[63] Continuation-in-part of Ser. No. 743,916, Aug. 12, 1991, abandoned, which is a continuation-in-part of Ser. No. 420,472, Oct. 12, 1989, abandoned.

[51] Int. Cl.$^5$ .................................................. C09C 1/36
[52] U.S. Cl. .................................... 106/446; 106/416; 106/465
[58] Field of Search ............... 106/416, 492, 446, 464, 106/465, 436

[56] References Cited

U.S. PATENT DOCUMENTS

| | | | |
|---|---|---|---|
| 2,974,108 | 3/1961 | Alexander | 252/313 |
| 3,476,692 | 11/1969 | Hoffmann | 252/317 |
| 3,726,700 | 4/1973 | Wildt | 106/300 |
| 5,116,418 | 5/1992 | Kaliski | 106/419 |

FOREIGN PATENT DOCUMENTS 2917313  7/1980  Fed. Rep. of Germany.

*Primary Examiner*—Anthony Green
*Assistant Examiner*—Chris Gallo
*Attorney, Agent, or Firm*—Sachs & Sachs

[57] ABSTRACT

Composite pigment products containing from 4.5% up to 50%, by weight, of particulate titanium dioxide in which particles of the latter and other particulate pigmentary, subpigmentary and nonpigmentary components are cemented intrinsically with the aid of in-situ synthesized complex microgels.

14 Claims, No Drawings

TIO$_2$-CONTAINING COMPOSITE PIGMENT PRODUCTS

This application is a continuation-in-part of co-pending patent application Ser. No. 07/743,916 for "Structural Aggregate Pigments," Filed Aug. 12, 1991 now abandoned, which was a continuation-in-part of patent application Ser. No. 07/420,472 for "Structural Aggregate Pigments," Filed Oct. 12, 1989 now abandoned.

BACKGROUND OF THE INVENTION

1. Field of the Invention

This invention relates to novel composite pigment products comprising from 4.5% up to 50%, by weight, of particulate titanium dioxide.

More specifically, this invention relates to composite pigment products in which particles of titanium dioxide and other pigmentary and subpigmentary components, as well as disperse and soluble nonpigmentary components, are coflocculated and cemented intrinsically with the aid of in-situ synthesized complex (multicomponent) functional microgels.

2. Discussion of the Relevant Art

White pigments encompass a class of particulate materials which are essentially colorless, insoluble, nontoxic, reasonably nonabrasive, and have dimensions favoring a diffuse reflection, or scattering, of light constituting the visible portion of the electromagnetic spectrum with wavelengths ranging from 420 nm for violet to 660 nm for red.

In accordance with the laws of physical optics, maximum scattering of light occurs when a propagating light wave encounters in its path an obstacle, a pigment particle as the case in point, whose dimensions are equal to one-half of the length of the impinging wave. At equal particle dimensions, pigmentary materials with higher refractive indexes, whose values may range from 1.41 for silica to 2.73 for rutile, scatter the light more efficiently than analogous materials with lower refractive indexes.

The most elementary physical model of light scattering may be considered one in which monochromatic light is diffracted by a single spherical particle. Maximum diffraction of the blue, green and red portions of the light spectrum (additive primary components of light) is obtained with particle diameters of about 150 nm, 200 nm and 250 nm, respectively. By integrating the comprehensive spectral response of a single spherical particle scattering polychromatic light, mapped as a function of particle diameter, one can calculate that the maximum light scattering occurs with a particle of about 200 nm in diameter.

A universally useful model of light scattering by pigments must, however, be applicable both to any arbitrary pigment shape (virtually all inorganic pigments, other than TiO$_2$, are nonspherical) as well as to integral end-use formations containing these pigments, such as paper-coating and paint films, filled paper or pigmented plastics. Let us consider, for example, a single, highly anisometric particle of kaolin clay in the form of a hexagonal platelet. The light waves of different lengths impinging upon such a multifaceted platelet scatter with different intensities depending on how closely the dimensions of a particular facet of a clay platelet approximate one-half of the length of the impinging light wave. Among the multitude of facets by which the impinging light may be scattered are, for example, platelet faces (in the x,y plane) or edges and protrusions from platelet's surfaces (in z direction). Moreover, the impinging light waves are scattered independently by each of the six triangular tips of the hexagonal platelet, the shorter waves being scattered more efficiently closer to the tips, across shorter distances, and, correspondingly, the longer waves being scattered more efficiently farther from the tips, across longer distances.

The ability to scatter light is a universal property both of particulate and extensive matter. Hence, even an "infinitely" large, most precisely polished mirror also scatters light, though only to a very negligible extent. In general, all light waves, regardless of length, will scatter with different intensities across all physical obstacles encountered in their path, such as individual particles or parts of aggregated matter, grain boundaries, or sites of localized stress concentrations giving rise to elastooptical effects.

As far as white pigments are concerned, it should be emphasized that the latter represent a pragmatic class of particulate materials, useful in the trade, whose features are defined by a convention. In the very minimum, pigments must consist to a predominant extent of particles whose dimensions uniquely favor the scattering of light, not so much with regard to the performance of individual particles but primarily with regard to the performance of the resultant end-use formations containing these particles. The latter requirement necessitates that pigments additionally possess certain specific features and performance properties, though the scope of the latter is not fixed but expands steadily in keeping pace with the scientific and technological advancements in the field of pigments.

Whether a solid particle can be classified as pigmentary depends not only upon raw physical dimensions but also upon the particle's morphology. Hence, monolithic, spherical, virtually perfectly isometric, single-faceted particles of TiO$_2$, or organic pigments, cease to be pigmentary for all practical purposes when their particle diameters exceed about 1 μm. Overall, a spherical shape for mineral pigment particles is disadvantageous in many respects. Spheres, being perfectly isometric, single-faceted geometric bodies, scatter the light more selectively, hence, less efficiently, than analogous anisometric particles of an equivalent mass. Moreover, spheres have an inherent tendency to form dense, closely packed structures with a low void volume, characterized by a low light-scattering efficacy. Closely packed ensembles of monodisperse populations of spheres have a maximum void volume of only about 26%, which, for polydisperse populations of spheres, can fall below 15%, or even 10%.

The formation of closely packed ensembles of pigment particles, the closest such packing occurring with spherical ones, is unavoidable in paper coating and filling or in paints, causing many potential light-scattering sites to become inaccessible to the impinging light waves. Hence, the magnitude of integral light scattering of a formation of closely packed spherical particles is invariably much less than the sum of potential light-scattering effects attainable with the individual component particles scattering the light as discrete spheres.

Multi-faceted pigment particles, such as intrinsically aggregated clusters of elementary, ultrafine (sub-pigmentary) particles of precipitated silica or metal silicates, on the other hand, can be as large as 10 μm, or even 20 μm, e.s.d. (equivalent spherical diameter) and still be pigment worthy. Regardless of morphological features, however, all particulate materials with dimensions finer than 0.1 μm e.s.d. are not pigment worthy, being classified as "subpigmentary." It should be pointed out, though, that inherently fine-particle-size pigment products, such as titanium dioxide or high-glossing kaolin clay, may contain a substantial proportion of subpigmentary particles.

White pigments traditionally have been divided in the art into "primary," with a refractive index of about 2.0 or higher, and "secondary," with a refractive index ranging from about 1.4 to 1.65. Following the example of lithopone, introduced on the market around 1875, interspacing of particles of high-refractive-index primary pigments with particles of low-refractive-index secondary ones has become a standing practice in the paint and paper industries. As the first composite pigment ever, obtained by coprecipitating birefringent zinc sulfide (refractive indices 2.356 and 2.378), used in proportions of from 30 to 60%, by weight, with barium sulfate (refractive index 1.64), lithopone represents a classical example of a virtually perfect interspacing of a primary pigment with a secondary one. As titanium dioxide ($TiO_2$) was introduced on the market in 1919, quickly becoming the dominant high-refractive-index white pigment on the market, it became instantly clear that the most economical performance is obtained when $TiO_2$ is used in blends with less expensive, low-refractive-index co-pigments (extenders). It was also recognized, however, that a great deal of detrimental selective fractionation and flocculation occurs in practical applications involving the use of such loose pigment blends. Hence, various composite pigments were developed in which the primary pigments, such as titanium dioxide or zinc sulfide (ZnS), were first intimately blended with, and subsequently affixed to, secondary pigments (extenders), to achieve a permanent immobilization of both particulate species relative to each other.

The initial main approaches used in the prior art to manufacture composite pigments containing particulate titanium dioxide involved either a precipitation of the latter in a slurry of a secondary pigment (barium sulfate or calcium sulfate), or a simultaneous coprecipitation of both the titanium dioxide and secondary pigment, followed by dewatering, calcining and pulverization. The above $TiO_2$-based composite pigments, whose manufacture was based in part on a simulation of the lithopone process, were called "coalesced" composite pigments. The intrinsic cementation of $TiO_2$/extender aggregates, ensuring their mechanical integrity, was obtained by thermal sintering.

The subsequent approaches toward synthesizing analogous composite pigments were based on various methods of treatment of aqueous slurries of extraneously prepared primary and secondary pigments to obtain maximum mutual interspacing and a permanent immobilization of the primary and secondary particulate species relative to each other. Accordingly, the in-situ coprecipitated, $TiO_2$-based composite pigments of the prior art can be classified as "intrinsic" composite pigments, to distingush them from the "derivative" ones, synthesized from extraneous pigmentary components.

It should not be overlooked, however, that the secondary pigments (extenders, co-pigments) used along with titanium dioxide are, as a rule, highly polydisperse systems characterized by a wide spread of particle dimensions. Hence, while the use of co-pigments is, overall, beneficial to the resultant optical-performance efficacy of titanium dioxide, the oversized particles in co-pigments have a well-documented adverse effect upon the flocculation characteristic of the relatively small $TiO_2$ particles, this adverse effect being particularly strongly pronounced in dilute and non-optimally dispersed slurries.

The effect of larger particles on the flocculation tendency of smaller particles was first described by V. D. Samygin et al. in the article titled "Mechanism of Mutual Flocculation of Particles Differing in Size" (translated from *Kolloidnyi Zhurnal*, Vol. 30, No. 4, pp. 581–586, July-August, 1968), dealing with the flocculation phenomena in flotation processes. According to the above article, the rate of adhesion of fine particles to coarser ones may be higher by a factor of $10^3$–$10^4$ than the rate of cohesion between finer particles. Applicant's subsequent experimental work showed that the above phenomenon is rather universal and is encountered in both dry and wet disperse systems. For example, coarser and more abrasive particle aggregates were obtained by calcining (thermal sintering) of high-glossing clay feeds with particle dimensions ranging from 0.1 to 2.0 μm e.s.d. than by calcining of analogous feeds from which essentially all particles larger than about 1.5 μm e.s.d. were removed by centrifugal separation.

The first of the above-mentioned novel approaches to the manufacture of derivative composite pigments, based on flocculation (coflocculation) of pigmentary components suspended in aqueous media, was disclosed by Alessandroni in U.S. Pat. Nos. 2,176,875, 2,176,876 and U.S. Pat. No. 2,176,877. In one case, for example, the coflocculation was carried out by adding an extraneous flocculant to an aqueous slurry containing both the primary, high-refractive-index pigment (titanium dioxide or zinc sulfide) and the secondary, low-refractive-index extender pigment. In another case, the coflocculation of pigmentary components was attained when a separately prepared aqueous slurry of titanium dioxide, or zinc sulfide, dispersed with one type of dispersant, was blended with a separately prepared slurry of an extender pigment dispersed with another type of dispersant "antipathetic" to the former one. In both of the above cases, the flocculated media were filtered, dewatered, dried and pulverized without the calcining step being employed.

Based on the present colloid-chemical experience and in view of the preceding discussion of the article by Samygin, however, it is clear that a high degree of detrimental separation and selective aggregation of the particulates, according to both species and size, could not have been avoided with the slow and inefficient flocculation mechanisms employed by Alessandroni. Moreover, the approaches used by Alessandroni are lacking a viable adhesion mechanism capable of imparting an adequate mechanical integrity to the resultant composite pigments.

Another approach toward the synthesis of white and colored derivative composite pigments was disclosed in U.S. Pat. No. 3,453,131 to Fadner. According to the latter, single and/or multiple species of functional colloidal particles of ". . . carbon black, acetylene black, iron oxide, Mannox blue, azobisisobutyronitrile, zinc oxide, methyl zimate, sulfur, titanium dioxide, polystyrene, or antimony oxide or mixtures thereof" with diameters ranging from 0.01 μm to 1.0 μm were attached by means of a "coupling agent" to platy clay particles, ranging from 0.5 $\mu$m to 3.0 $\infty$m in diameter, used as a carrier medium.

The above composite pigments were synthesized by adding 0.5% to 25%, by weight, of an aliphatic acid (coupling agent) into an aqueous slurry of pigmentary components and ". . . mixing the composite suspension for a sufficient time to form the composite colloidal particles." The resultant "composite particle suspensions" were considered as the final products intended for use in various commercial formulations in which the individual component materials have traditionally been employed in a loose (nonaggregated) state.

U.S. Pat. No. 3,453,131 to Fadner also teaches that, "Alternately, the composite particles can be separated from the aqueous medium, for instance, by freeze-drying or by spray-drying, and utilized subsequently in formulating aqueous, non-aqueous or non-liquid composition."

Unlike Alessandroni, who relied on a direct flocculation of composite slurries, Fadner employs compounding of the particulates present in composite (multicomponent) slurries with the above-mentioned coupling agents. As far as the mechanism of this compounding, or the action of the coupling agent, is concerned, Fadner explicitly states that "The scientific factors governing the formation of composite particles according to this invention are not completely understood." Moreover, Fadner does not provide any information with regard to the mechanical integrity of the dried composite particles, but an analysis of the functional aspects of the composite pigment systems in question clearly points to the lack of any practically significant adhesion mechanism capable of providing such an integrity.

Another approach to synthesizing composite pigments from blends of $TiO_2$ and a coarse calcined clay, or a coarse delaminated clay, was disclosed in U.S. Pat. No. 3,726,700 to Wildt. It should be pointed out that although a flocculation of the particulates present in the reaction medium is unavoidable under the reaction conditions described in the above-mentioned patent, an intentional flocculation was not specified as an element of the strategy of the approach elected by Wildt. Instead, Wildt's approach was based on compounding the pigmentary raw materials present in the furnish with in-situ formed alumino-silicate or similar gels, of the type used routinely in the $TiO_2$ industry for the application of surface coatings to $TiO_2$ particles.

The mechanical integrity of Wildt's composite pigments was provided by thermally curing the in-situ-formed gels, called in the above patent ". . . hydrous oxide of aluminum, silicon, titanium, and mixtures thereof."

In analyzing the colloidal and kinetic aspects of Wildt's process, it is readily understood by those skilled in the art that a detrimental fractionation and selective flocculation of the pigmentary components employed, both according to species and size, are impossible to avoid in the lengthy synthesis process in which just a single step of digestion takes from 30 to 60 minutes. Furthermore, the above fractionation and selective flocculation were undoubtedly facilitated even more through the use of the dispersion-destabilizing alum. Although a permanent immobilization of $TiO_2$ particles relative to the extender particles was indeed attained in Wildt's composite pigments, there is also virtually no doubt that the latter immobilization was realized through the attachment of "blobs" of badly flocculated $TiO_2$ particles to the coarse extender (carrier) particles.

Perhaps the most fundamental point to be raised with regard to Wildt's composite pigments is that, in accordance with the relative proportions of $TiO_2$ and coarse-particle-size extenders employed, the number of available extender particles was far too low to approach even remotely an effective interspacing of $TiO_2$ particles present in the system, the oversized dimensions of the extender particles notwithstanding.

Since Wildt does not provide any numerical light-scattering data for the composite pigments in question, e.g., in a head-to-head comparison with rutile pigment used as the raw material for their synthesis, no unambiguous conclusion can be reached as to the true source of the claimed improvement of the hiding efficacy of paint systems formulated with the aid of the composite pigments in question. As is well known to those skilled in the art, however, an increased hiding efficacy of $TiO_2$-based paints can also be obtained by a simple addition of extraneous loose particles of high-oil-absorption silicates, of the same type as were synthesized in situ in Wildt's composite pigment.

In summary, the principal goal of keeping $TiO_2$ particles apart by interspacing them with particles of secondary pigments (extenders) and immobilizing both species relative to each other was approached in the prior art by synthesizing both intrinsic as well as derivative $TiO_2$-based composite pigments, further referred to also as "extended-$TiO_2$" composite pigments, with the aid of three fundamentally different approaches presented schematically in the following:

(1) In-situ coprecipitation of both titanium dioxide as well as extender particles in an aqueous medium, or precipitation of titanium dioxide particles in aqueous slurries of extraneous extender particles, the choice of extenders being limited in practice, in both of the above cases, to essentially only barium sulfate or calcium sulfate.

(2) Coflocculation of extraneously prepared titanium dioxide and extender pigments present in composite (multicomponent) aqueous slurries, using either extraneous flocculants or an in-situ interaction between two antagonistic (incompatible) dispersing agents in accordance with U.S. Pat. Nos. 2,176,875, 2,176,876 and 2,176,877 to Alessandroni.

(3) Compounding composite aqueous slurries of extraneously prepared titanium dioxide and extender pigments with coupling agents (aliphatic acids), in accordance with U.S. Pat. No. 3,453,131 to Fadner, or with (in-situ-formed) gel-like precipitates of hydrous oxides of silicon, aluminum and titanium, in accordance with U.S. Pat. No. 3,726,700 to Wildt.

Regardless of the type of the approach employed, the three key processing elements which are indispensable to a successful synthesis of derivative composite pigments of an extended-$TiO_2$ type are as follows:

(a) A maximum homooenization of the composite, well-dispersed pigment furnishes by inducing a statistically uniform spatial distribution of all particulates present in the aqueous reaction medium with the aid of suitable (high-performance) dispersants and intensive agitation regimes.

(b) Instantaneous immobilization ("freezing") of the dynamically induced and maintained, statistically uniform spatial distribution of all particulates present in the furnish to permanently preserve an equivalent statistically uniform distribution of these particulates in the resultant composite pigments.

(c) Intrinsic cementation of the resultant composite-pigment aggregates to impart adequate mechanical integrity to the composite pigment products, enabling them to withstand the shearing regimes to which they are routinely exposed in handling and end-use applications.

As is readily understood by those skilled in the art, the in-situ coprecipitated, coalesced intrinsic composite pigments ($TiO_2/BaSO_4$ and $TiO_2/CaSO_4$) of the prior art conform to all of the above-listed requirements. For example, the requirements specified under (a) and (b) were satisfied by virtue of the intrinsic coprecipitation, providing a perfect homogenization and mutual interspacing of the primary and secondary particulate species. The requirement specified under (c), on the other hand, was satisfied by sintering the intrinsically interspaced particulate species.

Although the coalesced, extended-$TiO_2$ composite pigments were manufactured for many years (until about 1970), their commercial demise was brought about by the inherently limited selection of viable extenders, narrowed down essentially to the unattractive barium sulfate and calcium sulfate.

Neither of the above-mentioned approaches satisfies the requirements (a) or (b) when applied to the synthesis of derivative $TiO_2$-based composite pigments of the prior art, as will become clear from the considerations to follow, and only Wildt's approach provides an adequate mechanical integrity to the resultant composite pigment products in accordance with the requirement (c).

First of all, a truly optimized pigment dispersion, such as is indispensable for a successful manufacture of derivative composite pigments in accordance with the requirement (a), mentioned above, can only be attained with a single monodisperse particulate species. In a slurry of a polydisperse pigment, for example, one can distinguish three distinct classes of particulates, namely, pigment fines, with particles smaller than 0.15–0.2 $\mu$m e.s.d.; intermediate fractions, with particles ranging from about 0.2 $\mu$m to about 0.5–0.7 $\mu$m e.s.d.; and "coarse" fractions, with particles larger than 0.7–1 $\mu$m e.s.d., differing significantly with regard to their behavior in aqueous media. Hence, while commercial slurries of polydisperse pigments of the above type are often referred to in the art as being "optimally" dispersed, in reality, each individual particle-size fraction is characterized by a different dispersion stability and, conversely, different resistance to flocculation.

The overall picture becomes yet more complicated with pigment slurries that are both polydisperse and heterodisperse (consisting of two or more different pigment species), such as are used for the synthesis of derivative composite pigments. It is thus impossible, for all practical purposes, to obtain an optimized dispersion of polydisperse composite slurries, in that each of the above-mentioned fractions and species has a different optimum dispersant demand, both quantitatively and qualitatively, and a different equilibrium between the dispersant adsorbed on the pigment and dissolved in the carrier medium (water). Hence, even if "optimally" dispersed slurries of individual pigments were prepared separately and then blended, a progressive destabilization of the disperse state would immediately set in. As a consequence, the polydisperse and heterodisperse phases present in the system (pigment furnish) would commence to separate (fractionate) and selectively flocculate according to species and size, starting with the relatively least stable disperse fraction and progressing toward the relatively more stable ones.

Ironically, the better the initial dispersion of a composite pigment slurry, the more pronounced are the phenomena of fractionation and selective flocculation when the slow and inefficient flocculation processes of the prior art are employed in making composite pigments.

It is thus obvious that an instantaneous immobilization of all particulate components of both heterodisperse and polydisperse pigment furnishes is indispensable for synthesizing $TiO_2$-based composite pigments in which the individual particles of $TiO_2$ are either intimately interspaced with extender particles, if the latter are present in sufficient numbers and have proper dimensions, or are at least distributed in a statistically uniform fashion within the flocculated composite pigment furnish and the resultant pigment aggregates. It is also obvious, however, that the abovementioned instantaneous immobilization can only be achieved with the aid of a truly instantaneous, indiscriminate and complete flocculation mechanism.

A flocculation mechanism having the latter attributes was unknown in the prior, art, however, before it was disclosed in U.S. Pat. No. 5,116,418 to Kaliski ("Process for Making Structural Aggregate Pigments," and the co-pending patent application Ser. No. 07/919,831 ("Functional Complex Microgels with Rapid Formation Kinetics"), Filed Jul. 27, 1992, both above applications being incorporated herein by reference. According to the above disclosures, composite pigments characterized by a statistically uniform distribution of all particulate components can be synthesized only with the aid of both well-dispersed pigment furnishes and an instantaneous, indiscriminate and complete flocculation process.

It is worth pointing out, though, that while an optimized pigment dispersion, attainable only with the use of highly efficient modern dispersants, is necessary for a successful synthesis of derivative composite pigments, the weak and slow flocculating processes of the prior art are incapable of effectively overriding the powerful action of the latter dispersants. It is not at all surprising, therefore, that Alessandroni makes no references with regard to any dispersion optimization of the composite raw material slurries to be flocculated, the dispersants listed being very inefficient or outright mediocre. Fadner, on the other hand, explicitly concedes in U.S. Pat. No. 3,453,131 (col. 5, lines 1–5): "The dispersant for the functional colloidal particles should be present in minimal amounts and should not be of a type that is so strongly adsorbed to the functional particles that it cannot be replaced by, or its function overcome by, the organic acid coupling agent."

The process for synthesizing $TiO_2$-containing composite pigments according to U.S. Pat. No. 3,726,700 to Wildt does not make any use of dispersants, as is clear from the following description:

"1. Titanium dioxide cooler discharge and the selected clay in the desired proportions are slurried in water (the term "slurrying in water" implies in the trade that no dispersants are being used - applicant) at 100–300 g/l of total solids.

2. While vigorously agitating the slurry, a solution of sodium silicate (400 g/l $SiO_2$) is added to the slurry in an amount necessary to give the desired weight percent of $SiO_2$, based on total pigment solids.

3. A solution of aluminum sulfate (100 g/l $Al_2O_3$)) is added in sufficient quantity to give the desired proportion of $Al_2O_3$.

4. The slurry is, optionally, then heated to 50°–70° C.

5. Since the pH is usually less than 5 at this point, sodium hydroxide is added to the agitated slurry until the pH reaches 7.8–8.3.

6. After a digestion for 30–60 minutes, with occasional additions for pH adjustments, the slurry is filtered, washed, dried and fluid energy milled."

As is well known to those skilled in the art, it is impossible to obtain a satisfactory deaggregation, let alone dispersion, of the composite pigment furnish in the above step (1) by simply slurrying the pigmentary components in water at 10–30% solids. As a matter of fact, a satisfactory deaggregation and dispersion of a pigment, or blend of pigments, cannot be attained in a diluted slurry even with the aid of the best dispersants available.

Although sodium silicate used in step (2) has some moderate dispersing action when used in concentrated pigment slurries at very low dosages (a few tenths of one percent on the weight of pigment), it acts as a flocculant, specifically, micro-flocculant, at the high proportions specified in Wildt's patent. The above flocculating action is still further compounded by the addition of aluminum sulfate in step (3), the optional heating in step (4), and the lengthy digestion of 30–60 minutes in step (6).

It is thus obvious that the principal goal of the above-discussed synthesis procedure, clearly defined by the following quotation from U.S. Pat. No. 3,726,700 to Wildt (col. 2, ln. 5–9), has not been attained: "It would be advantageous, therefore, if the titanium dioxide could be affixed to the inexpensive extender in such a manner that the optimum spacing could be maintained throughout the various processes of paint preparation, pigment dispersion and drying."

Wildt also states (col. 2, lines 13–19) that "A process for affixing pigment particles of colloidal size to particles of a non-swelling clay by coupling with organic acids is described in Fadner U.S. Pat. No. 3,453,131 but there is no suggestion that in using $TiO_2$ as the pigment it is possible to achieve a composite pigment of outstanding superiority in terms of light scattering efficiency."

While the above statement regarding the context of Fadner's disclosure is basically correct, Wildt himself has not offered any direct evidence that his composite pigments do indeed provide such a superior light-scattering efficiency. As previously indicated, the increased hiding in paints, claimed by Wildt, can also be obtained by indirect means without increasing the intrinsic light-scattering efficacy of the composite pigment itself. As a matter of fact, neither Wildt, nor Fadner, nor Alessandroni have offered any objective evidence that the immobilized $TiO_2$ particles in the composite pigments in question have indeed acquired steric configurations favoring increased light scattering, even though such an evidence can be secured readily in terms of light-scattering data or electronphotomicrographs.

In an analogy to the path of reasoning pursued by Fadner, Wildt postulates as follows: "That the product thus obtained consists of particles of $TiO_2$ which are dispersed on, and adhered to, the larger clay particles is shown by the lack of selective sedimentation when dispersed in water, the unchanged composition after fluid energy milling, and the markedly improved hiding power conferred to latex paints when compared to a mechanical mixture of equivalent $TiO_2$-clay composition."

As is readily understood by those skilled in the art, however, the above "proofs" constitute conditions which are merely necessary, but not sufficient, to reach the above conclusion in that (a) the thermally cured alumino-silicate cement formed in situ in Wildt's process is sufficiently strong to permanently affix $TiO_2$ and extender particles (regardless of whether their steric configurations are overall favorable or not), to prevent any subsequent separation in handling and end-use applications; and (b) a permanent, durable, cementation of the individual particulate ingredients of composite pigments does not prove that affixing $TiO_2$ particles "... to the inexpensive extender in such a manner that the optimum spacing could be maintained throughout the various processes . . . ," postulated in the patent in question, has been even remotely approached.

The issue of extending $TiO_2$ pigments, treated extensively in the literature in the last several decades, has been most fittingly summarized by J. H. Brown in the article titled "Crowding and Spacing of Titanium Dioxide Pigments," issued in the *Journal of Coating Technology*, Vol. 60, No. 758, Pages 67–71, March 1988, dealing with hiding properties of nonporous paints. In the above article Brown dismisses the usefulness of particulate extenders, opting, instead, for coatings deposited on the surface of $TiO_2$ particles. Brown finally concludes that, under the best of circumstances, the hiding power of coated $TiO_2$ pigments in paints with a pigment-volume concentration greater than 20% could be as much as 10% higher than that of a conventional (uncoated) rutile, which is not a major improvement by any means.

While the industrial experience with derivative composite pigments of the extended-$TiO_2$ type, obtained by co-flocculation or compounding with extraneous or in-situ synthesized agents, has been consistently negative, it should be emphasized that the principal reason for the above lack of a practically acknowledged success was that the approaches known in the prior art, based on slow and inefficient flocculation processes, were incapable of preventing the detrimental segregation and selective flocculation of pigmentary components during the course of the synthesis process.

It is also worth noting that while all composite pigments are, de facto, aggregates, the aggregation as such, specifically, a controlled aggregation, was never intentionally employed in the prior art as an independent tool for enhancing the optical properties of composite pigments. Instead, the latter enhancement has always been attempted through interspacing of $TiO_2$ particles with particles of extender pigments, steadfastly ignoring the fact that pigments (extenders) with particle dimensions small enough to be suitable for a truly effective interspacing have never been available on the market. It must thus be stated unequivocally that, with the exception of the intrinsic, coprecipitated $TiO_2/BaSO_4$ ($CaSO_4$) composite pigments, mentioned previously, the prior-art references relating to interspacing of $TiO_2$ particles with extender particles are a clear evidence of the prevailing confusion with regard to the above subject matter.

The fact that light-scattering properties of entire pigment populations can be improved by aggregating in situ pigment fines, whose dimensions in a discrete state are too small for efficient light scattering, was first discovered by the applicant and published in the *Journal of the Technical Association of the Pulp and Paper Industry (TAPPI)*, Vol. 53, No. 11, November 1970, Pages 2077-2084 ("Performance of Some Clays in Starch-Containing Paper-Coating Films; Part I. Black Glass Plates as Model Substrates"), preceded by a presentation at the TAPPI Coating Conference held in Houston, Tex., May 3-4, 1970.

The above publication shows plots of light-scattering coefficients at the wavelengths of 457 and 577 nm as a function of the binder-volume fraction (FIGS. 6 and 7), assessed for three different clay pigments made into coating colors and deposited as films on optically flat black glass plates as coating substrates. The slopes of the curves representing the light-scattering coefficients of No. 1 and No. 2 clays ascend initially with the increasing binder-volume fractions and, after reaching the maximum values at a binder-volume fraction corresponding to about 5 parts of starch per 100 parts of clay, by weight, descend as the binder level is further increased.

This initial increase of the light-scattering coefficients is explained in the above publication "... by an aggregation of clay fines effected by the initial addition of binder. The aggregates of ultrafine particles, which are understood here as assemblies of a very few such particles, should scatter the light more effectively than the individual components." The subsequent steady decline of the magnitude of the light-scattering coefficients is explained as follows: "An increase of the binder content of the coating systems beyond the $F_{bv}$ (binder-volume fraction—explanation added by the applicant) value of 0.080 (5 parts starch per 100 parts clay, by weight) appears to cause a further growth of the assemblies of pigment particles, so that the optimum dimensions of the light-scattering sites are exceeded."

With the relatively coarse mechanically delaminated clay, having a low proportion of particles with equivalent spherical diameters in the 0.1 $\mu$m to 0.2 $\mu$m range, the light-scattering coefficients of the coatings declined from the very first incremental addition of binder because of the scarcity of ultrafine particles amenable to a beneficial aggregation. The relatively coarser intrinsic structure of coating films containing the mechanically delaminated clay, compared to those containing No. 1 and No. 2 clays, has been verified with the aid of the empirical parameter called "Rho" (after the Greek letter $\rho$), defined in the above publication as the ratio of light-scattering coefficients determined at 577 nm and 457 nm for the same coating film.

With coating films characterized by intrinsic structures that are relatively fine, such as binderless coatings or coatings having a low binder-volume fraction, the magnitudes of the corresponding "Rho" parameters are low. As the intrinsic coating structures become coarser, as was the case with all coatings discussed in the above publication in which the binder content was increased, the magnitude of Rho increases accordingly.

It becomes apparent on the basis of the above considerations, backed by practical experience, that the light-scattering efficacy of end-use formations containing pigments depends not only upon the original shapes and dimensions of pigment particles but, to a major extent, also on how these particles aggregate (flocculate) into the resultant end-use formations. The publication by Kaliski (*TAPPI Journal*, Vol. 53, No. 11, November 1970, pages 2077-2084) thus established scientific foundations for a new pigment technology opening the way to designing and manufacturing entirely new lines of derivative pigment products with improved optical and functional performance properties, synthesized by a controlled aggregation of extraneous pigmentary raw materials by themselves or combined with a variety of subpigmentary and/or nonpigmentary particulates.

Indeed, the first patent pertaining to the manufacture of aggregate pigments with an improved optical performance (U.S. Pat. No. 4,075,030: High Bulking Clay Pigments and Methods for Making the Same) was issued in 1978 to Bundy et al., with related patents by other inventors to follow. It should be pointed out, though, that none of the patented aggregate pigments was synthesized under conditions allowing a satisfactory control of the aggregation process, since the later control can only be achieved with the aid of an instantaneous, indiscriminate and complete flocculation. A flocculation process of the above-mentioned type was unknown in the prior art, however, before the previously mentioned disclosure by the applicant. Moreover, as documented amply by industrial experience, the problem of imparting an adequate mechanical integrity to aggregate pigments, while simultaneously generating in a controlled manner beneficial aggregate structures, has never been resolved satisfactorily in the technology of aggregate pigment products of the prior art.

Novel methods for the manufacture of practically countless types of aggregate pigments with exotic compositions, enhanced optical properties, excellent mechanical integrity, and unique functional properties, have been disclosed in U.S. Pat. No. 5,116,418.

It is intended hereinafter, therefore, to demonstrate how novel derivative composite pigment products can be synthesized by a controlled aggregation of primary and secondary (extender) pigments dispersed in aqueous media (furnishes), optionally including various subpigmentary and nonpigmentary particulates and auxiliary soluble media. It is also intended to provide an unambiguous classification of derivative aggregate composite pigment products of the extended-$TiO_2$ type to clearly distinguish between those intrinsically interspaced ones and those of a "pseudo-interspaced" type characterized merely by a statistically uniform distribution of the particulate components.

In accordance with the foregoing and disclosures to follow, it is an object of the present invention to provide formulations for novel composite pigment products containing from 4.5% up to 50%, by weight, of particulate titanium dioxide, synthesized by the general method disclosed in the previously mentioned U.S. Pat. No. 5,116,418, the optical-performance efficacy of the composite pigments under discussion being superior to that of the equivalent loose blends of titanium dioxide and raw materials employed for their synthesis.

In particular, it is an object of the invention to provide formulations for composite pigment products containing from 4.5% up to 50%, by weight, of particulate titanium dioxide, encompassing both rutile and the slightly less efficient anatase, derived from commercial titanium dioxide pigment products in the state "as is," or comminuted beyond the limits of comminution practiced in the prior art.

It is also an object of the invention to provide formulations for composite pigment products containing from 4.5% up to 50%, by weight, of particulate titanium dioxide combined with extraneously prepared, low-refractive-index inorganic and/or organic pigments.

It is a further object of the invention to provide formulations for composite pigment products containing from 4.5% up to 50%, by weight, of particulate titanium dioxide, also containing extraneously prepared particulate materials which are subpigmentary and/or nonpigmentary.

It is a yet further object of the invention to provide formulations for composite pigment products containing from 4.5% up to 50%, by weight, of particulate titanium dioxide, also containing carbon black to impart extra-high opacifying properties to the latter pigment products, thus rendering them especially well suited for applications such as the manufacture of lightweight newsprint or paints and lacquers with superior hiding properties.

It is a still further object of the invention to provide formulations for composite pigment products containing from 4.5% up to 50%, by weight, of particulate titanium dioxide, also containing from 0.005% to 5%, by weight, of color dyes to eliminate the residual yellow hue inherent to all commercial $TiO_2$ pigments and/or render the resultant composite pigments directly applicable to coloring of paints, plastics and synthetic fibers.

It is a yet further object of the invention to provide formulations for composite pigment products containing from 4.5% up to 50%, by weight, of particulate titanium dioxide, also containing from 0.001% to 0.5%, by weight, of chemically built-in organic, cationically active compounds with at least two reactive groups in each molecule to impart controlled levels of organophilic properties to the resultant pigment products, thus rendering them uniquely compatible with, and dispersible in, organic media such as plastics, synthetic fibers and solvent-based lacquers and paints.

It is a yet further object of the invention to provide formulations for composite pigment products containing, in addition to extender pigments and other auxiliary materials, from 4.5% up to 50%, by weight, of particulate titanium dioxide, in which the particulate ingredients are coflocculated into aggregates whose intrinsic structure and spatial distribution of the light-scattering sites and functional sites provide optical- and functional-performance efficacies that are superior to those of the equivalent loose blends of $TiO_2$ and other raw materials employed.

It is also a particularly special object of the invention to provide general principles of qualitative, quantitative and functional formulating to enable one to custom design composite pigment products containing from 4.5% up to 50%, by weight, of particulate titanium dioxide in combinations with other particulate components, having overall optical and functional-performance characteristics superior to those attainable with the aid of the equivalent blends of loose (nonaggregated) particulate raw materials.

SUMMARY OF THE INVENTION

The present invention relates to derivative composite pigment products comprising from 4.5% up to 50%, by weight, of at least one type of particulate titanium dioxide; from 5% to 95%, by weight, of at least one extender pigment; from 0.5% to 10%, by weight, as determined by ashing, of in-situ-synthesized complex functional calcium-silico-aluminate or similar microgels, further in the specification and in the claims to follow referred to in generic terms, regardless of their detailed chemical composition, as complex functional microgels or microgel cements, optionally including at least one of the following additional materials:

(a) from 0.5% to 95%, by weight, of at least one mineral particulate subpigmentary material;

(b) from 0.5% to 25%, by weight, of at least one high-oil-absorption particulate material with a specific surface area larger than 100 $m^2/g$;

(c) from 0.25% to 20%, by weight, of at least one organic, particulate non-film-forming material;

(d) from 0.25% to 5%, by weight, of at least one disperse and/or soluble organic polymer adhesive;

(e) from 0.001% to 0.5%, by weight, of at least one organic, cationically active compound with at least two reactive groups in each molecule;

(f) from 0.005% to 5%, by weight, of at least one color dye;

(g) from 0.005% to 0.2%, by weight, of carbon black; and (h) from 0.1% to 2%, by weight, of synthetic and/or cellulosic microfibrils.

DESCRIPTION OF THE PREFERRED EMBODIMENTS

In the preferred mode of practicing the present invention, novel composite extended-$TiO_2$ pigment products for paper, paint and plastic applications are manufactured from 4.5% up to 50%, preferably, 5% up to 45%, by weight, of particulate titanium dioxide ($TiO_2$) combined with inorganic and organic extender pigments, subpigmentary extenders, as well as auxiliary nonpigmentary particulate and soluble materials, coflocculated and cemented intrinsically with the aid of in-situ synthesized complex functional microgels.

The preferred particulate (rutile and anatase) $TiO_2$ materials used for synthesizing the composite pigments under discussion can be of any of the following types or blends thereof in any proportions and combinations:

(a) $TiO_2$ pigments, exemplified by commercial rutile and anatase products, having essentially 100%, by weight, of particles finer than 1.5 $\mu m$; 98–99% finer than 1 $\mu m$; and 35–50% finer than 0.3 $\mu m$ in diameter.

(b) Extra-fine $TiO_2$ obtained by comminuting commercial titanium dioxide pigments beyond limits of comminution practiced in the prior art to obtain $TiO_2$ particle populations that are essentially 100%, by weight, finer than from 0.3 $\mu m$ to 0.9 $\mu m$ in diameter.

(c) Borderline pigmentary $TiO_2$ obtained by comminuting commercial $TiO_2$ pigments with the aid of tungsten-carbide balls with diameters ranging from about 10 $\mu m$ to 70+ $\mu m$, having an essentially monodisperse particle population with a representative diameter of about 0.2 $\mu m$.

(d) Subpigmentary $TiO_2$ obtained by comminuting commercial $TiO_2$ pigments with the above-mentioned tungsten-carbide balls, having essentially all particles finer than 0.1 $\mu m$ in diameter.

The preferred pigmentary extenders for synthesizing $TiO_2$-containing composite pigment products of the present invention encompass:

(a) fine-particle-size calcined clays (derived from very-fine-particle-size kaolin clays, defined hereinafter), whose largest particles are essentially 100%, by weight, finer than 3 $\mu m$ e.s.d., preferably, 100%, by weight, finer than 2 $\mu m$ e.s.d., the average equivalent spherical diameter being about 0.4–0.8 $\mu m$;

(b) extraneously precipitated pigments, such as calcium carbonate, calcium silicate, calcium sulfate, hydrated alumina, hydrated silica and alumino-silicates, whose largest particles are essentially 100%, by weight, finer than 5 μm e.s.d.;
(c) very-fine-particle-size kaolin clays (often referred to in the trade as high-glossing clays), whose largest particles are about 95–100%, by weight, finer than 2 μm e.s.d., the average equivalent spherical diameter being about 0.25–0.35 μm;
(d) naturally occurring, beneficiated talcum, calcium carbonate and gypsum, whose largest particles are essentially 100%, by weight, finer than 5 μm e.s.d.; and
(e) spherical, non-film-forming (non fusing into continuous films at room or moderately elevated temperatures) polystyrene and polyacrylic polymer-emulsion particulates ("plastic pigments"), having average particle diameters ranging from about 0.15 μm to 0.5 μm.

The preferred subpigmentary extenders encompass ultrafine particulate calcium silicates and alumino-silicates, having average particle dimensions of from about 0.01 μm to 0.1 μm, obtained by an intensive mechanical deagglomeration of the corresponding pigmentary materials.

The preferred pigmentary raw materials intended primarily for imparting various functional-performance features to the resultant aggregate pigments encompass montmorillonite, bentonite and synthetic high-oil-absorption materials, e.g., special grades of calcium silicates, having a specific surface area larger than 100 m²/g, whose largest particles are essentially 100%, by weight, finer than 5 μm.

The preferred subpigmentary raw materials intended primarily for imparting various functional-performance features to the resultant aggregate pigments encompass:
(a) ultrafine talcum, having average particle dimensions of from about 0.01 μm to 0.1 μm, obtained by an intensive comminution of the corresponding commercial pigmentary materials;
(b) ultrafine precipitated calcium carbonate, having average particle dimensions ranging from about 0.01 μm to 0.1 μm, used in the state "as is" or additionally mechanically deagglomerated; and
(c) spherical, non-film-forming (non fusing into continuous films at room or moderately elevated temperatures) polystyrene polymer-emulsion particulates having average particle diameters of about 0.03 μm.

The preferred auxiliary (nonpigmentary) particulate raw materials for synthesizing the aggregate pigment products of the present invention encompass:
(a) conventional polymer-emulsion adhesives (latexes), having average particle diameters ranging from about 0.07 μm to 0.3 μm;
(b) ultrafine polyacrylic emulsion-polymer adhesives, having average particle diameters smaller than 55 nm and glass-transition temperatures ranging from +20° C. to −60° C.;
(c) carbon black, preferably deagglomerated by the master-batch method described in the specification, used preferably in a combination with water-soluble and/or disperse (polymer-emulsion) adhesives and organic polyelectrolytes;
(d) organic color dyes, used preferably in a combination with water-soluble and/or disperse (polymer-emulsion) adhesives and organic polyelectrolytes; and
(e) synthetic and/or cellulosic microfibrils with a length of about 1–10 μm.

The preferred auxiliary water-soluble materials for synthesizing the aggregate pigment products of the present invention encompass:
(a) natural and/or synthetic water-soluble adhesives, such as starch, protein, polyvinylalcohol or polyacrylates;
(b) organic, cationically active chemical compounds with at least two reactive groups in each molecule, such as cationic surfactants, organometallic Werner complexes and cationic polyelectrolytes; and
(c) ionically-active, preferably cationic, watersoluble organic color dyes.

The preferred process for the manufacture of the derivative composite pigment products of the present invention is based on an instantaneous, indiscriminate and complete coflocculation of particles of titanium dioxide and extender pigments, along with other particulate subpigmentary and nonpigmentary materials as well as soluble materials, with the aid of the in-situ synthesized complex (multicomponent) functional microgels disclosed in the previously cited U.S. Pat. No. 5,116,418 as well as the co-pending application Ser. No. 07/919,831 (Filed Jul. 27, 1992).

The above-mentioned complex microgels are formed in two distinct process stages, a different polymerization mechanism being active in each stage.

In the first process stage, two separate reagent solutions are introduced into the aqueous furnish comprising particulate titanium dioxide and other auxiliary materials, which are particulate and/or soluble, pigmentary and/or nonpigmentary. One of these reagent solutions contains an alkali-metal, or quaternary ammonium silicate, preferably sodium silicate. The other solution contains an alkalimetal aluminate and/or alkali-metal zincate, preferably sodium aluminate. An immediately commencing addition polymerization of the above "primary" subcolloidal-hydrosolsforming reagents leads to the formation of sodium-silicoaluminate (zincate) dimers, trimers and higher-rank oligomers. These transient, chemically reactive anionic polymer precursors remain, for a limited period, in a very specific state of solution, for which the objectively fitting term "subcolloidal hydrosols" is being employed herein.

In the second process stage, an aqueous solution containing at least one cross-linking agent selected from the group consisting of essentially colorless, bivalent and/or multivalent salts of calcium, magnesium, barium, aluminum, zinc and zirconium, preferably calcium chloride or nitrate, is introduced into the above-mentioned furnish containing the subcolloidal hydrosol formed in the first process stage.

The polycondensation reaction taking place between the transient, chemically reactive subcolloidal sodium-silicoaluminate (zincate) hydrosols and the inorganic cross linking salts leads to an ultrarapid formation of complex (multicomponent) calcium-silico-aluminate (zincate) or similar microgels, made up of networks of macromolecules of a polymer-polycondensate type. The colloidal consequences of the in-situ (in the furnish) formation of these complex microgels are an instantaneous, indiscriminate and complete flocculation (coflocculation) of any and all particulates present in the furnish in question.

It should be emphasized that the primary reagents used in the first stage of the process of the formation of the complex microgels, i.e., sodium silicate and sodium aluminate (zincate), must first react with each other to form the transient, chemically reactive subcolloidal sodium-silicoaluminate (zincate) hydrosols before any complex microgels can be formed (in the second stage of the process) by crosslinking these subcolloidal hydrosols with bivalent or multivalent inorganic salts. Hence, the subcolloidal sodium-silico-aluminate (zincate) hydrosols which, along with the inorganic cross-linking salts, are the factual microgelforming agents, must be considered as "higher-rank" reagents synthesized in situ from the primary reagents, i.e., sodium silicate and sodium aluminate (zincate). If the latter individual reagents reacted directly (on their own) with a cross-linking salt, e.g., calcium chloride, the products of such reactions would be merely suspensions, or precipitates, of solid, more or less crystalline crystalline particles of bicomponet calcium silicate and calcium aluminate (zincate), respectively, but not microgels, let alone complex microgels which, by definition, must contain at least three different building blocks in their macromolecular make-up.

The complex functional microgels used in practicing the present invention are formed in a virtually instantaneous manner. It is estimated that the chemical reaction of polycondensation between the low-molecular-weight, subcolloidal hydrosols mentioned previously and the bivalent and multivalent inorganic salts is completed in less than one microsecond. The consequences of this polycondensation are further manifested in a very rapid propagation of association between calcium-silico-aluminate (polymer-polycondensate) macromolecules, bringing about, within a couple of milliseconds, the development of colloidal formations with useful molecular weights that may reach billions. It is primarily this rapid continuous growth ("sweep") of molecular weights across such an enormously broad range which is deemed responsible for the instantaneous, indiscriminate and complete flocculation of even the most heterodisperse and polydisperse colloidal systems known in the art, regardless of these systems, physical, chemical or colloidal make-up.

While the complex (multicomponent) microgels used in practicing the present invention were completely unknown heretofore, the transient, chemically reactive subcolloidal hydrosols used for synthesizing these microgels need some elaboration to distinguish them from other, seemingly analogous systems of the prior art. In view of the confusion and lack of standardization in the present colloid-chemical terminology, a fundamental treatment of the subject matter of the present invention and a brief chronological review of the prior art pertaining to this subject matter is deemed necessary.

It is instructive to point out that the era of an active worldwide interest in natural and synthetic silica and silico-aluminates has commenced with the key discoveries of 1) water-soluble sodium silicates ("water glass") by Johann Nepomuk von Fuchs (1774–1856), who also suggested numerous practical applications for these interesting chemicals, encompassing adhesives, cements, flame retardants for paints, detergents, soap builders, dyeing adjuvants, metal fluxes and fertilizers;

2) metallic aluminum in 1825 by Oerstedt and Woehler, with most of the inorganic chemical compounds of this element known today having been described in the professional literature by countless scientists within the next few decades; and 3) the phenomena of ion exchange in soils (natural alumino-silicates) by J. T. Way in 1850.

The rapidly following discoveries of many other commercially valuable properties of silica and alumino-silicate minerals, e.g., in the application to the desiccation of gases, clarification of water, removal of color impurities from edible and mineral oils, or manufacture of pigments and catalysts, triggered intensive research efforts in the field of silica and alumino-silicates. These efforts were directed both towards improving the performance properties of naturally occurring materials as well as producing analogous or yet unknown synthetic materials with yet more improved or even entirely novel properties.

Due to the similar dimensions of ionic radii of $Si^{4+}$ and $Al^{3+}$ (0.4 Å and 0.50 Å, respectively), as well as an overwhelming abundance of these two elements in the lithosphere, countless forms of alumino-silicate minerals have been synthesized in nature by geochemical processes. The potential number of synthetic alumino-silicates, on the other hand, is virtually unlimited. That such an enormous variety of chemical compounds, characterized by distinct physical and colloid-chemical properties, can be synthesized using just one or two of the four simple, easily available reagents, i.e., sodium silicate, silicic acid, sodium aluminate and alum, has no precedent in the inorganic chemistry.

Thousands of patents issued in the past 150 years for synthetic silica and alumino-silicate products obtained with the aid of the above-mentioned reagents relate essentially to only three principal colloidal systems, namely, gels, sols and precipitates. The incredible diversification of the forms and properties of products synthesized with the aid of the same few reagents may be explained by accepting the hypothesis that colloids are the lowest-rank systems known in nature equipped with "memory." It is the latter which makes the colloids "remember" their history in chronological detail and react accordingly, as manifested in terms of their resultant material properties and functional behavior. Hence, any intentional, or even accidental, deviation from established synthesis procedures, or reaction conditions, will bring about inescapably certain differences, mostly quantitative but sometimes profoundly qualitative, in the constitution and/or functional properties of the resultant colloidal systems. Indeed, the thousands of similar, or even virtually identical, patented synthetic silica and alumino-silicate products differ among each other merely with respect to relatively minor quantitative compositional variations, procedural modifications in their synthesis (such as pertain to concentrations and orders of addition of reagents, pH ranges, temperature conditions and aging regimes), modified physical properties and new areas of application.

How even a seemingly minor processing detail may be decisive to the very usefulness of a synthetic aluminosilicate product may be illustrated, for example, by U.S. Pat. No. 2,757,085 to Paquin. As disclosed therein, satisfactory color-reactive alumino-silicate pigments, synthesized in situ in a papermaking furnish, could be obtained only if sodium aluminate was introduced into the furnish first, followed by the addition of sodium silicate, but not vice-versa. Similarly, U.S. Pat. No. 4,213,874 to Williams et al. teaches that satisfactory amorphous sodium aluminosilicate base exchange materials could be synthesized only if, among other things, the proper sequence and rate of addition of the reactants were maintained during the precipitation process.

The critical dependence of a successful preparation of colloidal systems on maintaining strictly defined process parameters and conditions is perhaps best summarized by S. Voyutsky in his textbook of COLLOID CHEMISTRY (Page 269, second paragraph), Mir Publishers, Moscow, translated into English in 1978: "Colloidal systems can be obtained by various chemical reactions: exchange, reduction, oxidation, hydrolysis, and so forth. But colloidal systems are not always formed in reactions capable of producing sols; they are formed only (underlining added by the applicant) at definite concentrations of the initial substances, at definite order of their mixing and temperature, and when some other conditions are met."

The preferred transient, chemically reactive subcolloidal hydrosols used in practicing the present invention are soluble sodium-silico-aluminates, synthesized upon the introduction of solutions of sodium silicate and sodium aluminate into the slurries of particulate raw materials ("furnishes") used for the manufacture of the composite pigments under discussion. As the result of an addition polymerization between the above-mentioned reagents, dimers, trimers and higher-rank oligomers evolve sequentially and continuously into very-low-molecular-weight sodium-silico-aluminate macromolecules of an anionic polyelectrolyte type. Because of the relatively low concentrations of the reagents employed, but mostly due to the prompt utilization of the transient subcolloidal hydrosols in question, the evolving sodium-silico-aluminate macromolecules are very small, their estimated dimensions being only slightly larger than i nm.

Such highly disperse systems represent special borderline solutions classified dimensionally above solutions of crystalloids (simple molecules or ions), but below colloidal solutions, e.g., those of starch, protein or polyacrylamide. A scientifically appropriate term "subcolloidal hydrosols" has been systematically used henceforth in referring to these systems, which should be distinguished from aquasols (hydrosols) of the prior art which are aqueous suspensions of solid particles with dimensions ranging from about 5 nm to 100-200 nm in diameter.

Historically, the terminology used in colloid chemistry has been developed in connection with the basic investigative tools available at the inception of the branch of science in question, namely, the conventional light microscope and ultramicroscope. The old-fashioned light microscopes equipped with low-aperture objectives made resolving particles smaller than 200 nm in diameter hardly possible; hence, such particles were referred to as "submicroscopic." On the other hand, ultramicroscopes, utilizing the Tyndall effect, made it possible to observe, though not resolve, particles as small as 5 nm in diameter. Hence, colloidal systems became traditionally the domain of ultramicroscopical investigations and their classification as "ultramicroscopic," with particle dimensions ranging from 5 nm to 200 nm, still has a great deal of validity for most practical applications. Regrettably, some less rigorous colloid textbooks still routinely list the colloidal dimensions as extending from 1 nm to 500 nm, or even 1 $\mu$m.

Modern scientific research has established unequivocally, however, that the traditional delineation between "colloidal" and "non-colloidal" (crystalloid) systems, established solely on the basis of the dimensions of particles of the disperse phase, has no scientific foundation. Hence, contemporary scientific doctrines refute the concept of "colloids" and "crystalloids," interpreted in the past in a rather absolute sense, accepting instead the existence of a very specific "colloidal state" associated with disperse systems conforming to the established criteria of "colloidlike" behavior. The reasons for this can be illustrated rather clearly using the example of sodium chloride, which behaves as a typical crystalloid in aqueous solutions and a typical colloid in benzene solutions, countless other such systems already having been identified.

Many experimental findings made during studies of extremely disperse systems attest particularly clearly to the uniqueness of the particle-dimension interval extending from 1 nm to 5 nm, in which the colloidal and crystalloid states overlap and deficiencies of the imperfect colloidchemical nomenclature are most evident. Hence, an unambiguous treatment of disperse systems of the above type frequently makes defining them in fundamental terms virtually mandatory, as has been established in dealing with many extremely important media such as surfactants, dyes, toxins and antitoxins. For example, the dimensions of individual molecules of some of the above-mentioned materials are larger than 1 nm (10 Å), considered as the conventional upper limit of crystalloid particles, but smaller than 5 nm (50 Å), considered as a practical lower limit for typical colloidal particles. Since the behavior of such systems overlaps the domains of both crystalloids and colloids, some authors have introduced the rather artificial term "semicolloids" to deal with these unusual solutions. Still other authors refer to such highly disperse systems, with particle dimensions ranging from 1 nm to 5 nm, as "amicrons" (subcolloids), as distinguished from "submicrons," applying to systems with particles larger than 5 nm in diameter.

Perhaps the most unfortunate aspect of colloid-chemical terminology is that the term "aquasol," and the equivalent term "hydrosol," in which the suffix "sol" stands for "solution," are used in referring to suspensions of ultramicroscopic solid particles in water. Although aquasols (hydrosols) do indeed appear as translucent (opalescent) solutions to an unaided eye, the latter, fundamentally incorrect, terms complicate the clarity of the issue when the scientific discourse revolves around systems of overlapping behavior (e.g., crystalloid/subcolloid or subcolloid/colloid) or extends beyond professional circles. It should be pointed out, though, that many rigorous colloid scientists systematically employ the scientifically correct term "suspensoids" in referring to aquasols (hydrosols) of the prior art.

The above-mentioned, nomenclature-related problems become even more complicated in dealing with novel subject matter, such as the subcolloidal sodium-silico-aluminate or similar hydrosols used to synthesize the complex microgels at the foundation of the present invention. The latter subcolloidal hydrosols constitute borderline solutions of transient, chemically reactive polyanionic molecules. As solutions, they have the appearance of completely clear, plain water, are totally devoid of any solid particles and do not exhibit the Tyndall effect.

The transient character of these continuously changing sub-colloidal sodium-silico-aluminate hydrosols renders the underlying oligomers and macromolecules fundamentally undefinable in terms of the exact physical dimensions or chemical compositions. This is understood best when considering that the reaction of addition polymerization, commencing with the moment the solutions of sodium silicate and sodium aluminate become introduced into the reaction space, proceeds continuously. Hence, even if there were a method capable of determining, at any given instant, the dimensions, molecular weights, or chemical compositions of the evolving macromolecules, such information would become obsolete in the very subsequent instant.

It is possible, however, to objectively define the unique system mentioned above using the criteria of the philosophy of science. According to these criteria, the continuously changing, transient subcolloidal hydrosols cannot be classified as "materials" in a conventional sense in that they have no definite form, mass or properties by which a material is conventionally described or defined, e.g., in textbooks of material science. Instead, the latter subcolloidal hydrosols, representing a very specific "material state," are defined in terms of (a) detailed description of the reaction medium and conditions at the onset of the synthesis of the hydrosols in question, i.e., at the point of time (t) where $t=0$; and (b) and arbitrary subsequent point of time ($t=x$). The latter means that if the in-situ synthesis of an arbitrary transient subcolloidal hydrosol is initiated at a time $t=0$, using identical reagents, reagent proportions and concentrations, temperature, pH and all other effective reaction conditions and process parameters, then, and only then, the resultant transient subcolloidal hydrosol will be exactly the same each time when passing through a subsequent fixed point of time $t=c$ ($x=c$).

While the above-discussed, continuously evolving (in statu nascendi) systems, e.g., sodium-silico-aluminates, are undefinable in conventional (material) terms, it is also completely certain that they are different from any existing natural or synthetic substances of the same nominal chemical compositions. By contrast, all sols are classified as "phaseal" colloids, the latter term indicating that the disperse phase is identical to an analogous phase existing on a macro scale and, in principle, could be obtained from the latter with the aid of mechanical comminution or other preparatory methods.

The transient aspects of the subcolloidal sodium-silico-aluminate hydrosols used in practicing the present invention must be particularly strongly emphasized since the process of addition polymerization between sodium silicate and sodium aluminate is a continuous one. Hence, at some advanced stage of polymerization (aging), particles of the above-mentioned subcolloidal hydrosols acquire sufficiently high molecular weights to exceed the solubility limits and transform into conventional aquasols, i.e., colloidal suspensions of solid particles. The period of aging necessary to initiate such a transformation may extend from less than a minute to several days, depending on the concentration of sodium silicate and sodium aluminate (zincate) in the reaction space, and is manifested by the appearance of the Tyndall effect.

As is understood by those skilled in the art, the chemical reactivity of the transient subcolloidal hydrosols in question, i.e., the ability to form complex microgels by a process of chemical cross-linking carried out with the aid of bivalent (multivalent) inorganic salts, decays with the increasing degree of polymerization (aging) and is lost almost completely when the solute particles transform into solid ones (such as are typical of conventional sols) after exceeding the solubility limits. It is important, therefore, that the second stage of the in-situ synthesis of complex microgels, in which the above-mentioned subcolloidal sodium-silico-aluminate or similar hydrosols are chemically cross-linked with the aid of bivalent and/or multivalent inorganic salts, be carried out before the advent of the Tyndall effect. In full-scale production-plant installa working in a continuous process mode, the above crosslinking is usually carried out within a period ranging from several seconds to a couple of minutes, counting from the moment the solutions of sodium silicate and sodium aluminate are introduced into the pigment furnish.

The primary purpose of the complex functional microgels under discussion is to induce an instantaneous, indiscriminate and complete flocculation (coflocculation) of all disperse raw materials present in the pigment furnish. Flocculation phenomena play a fundamental role in the manufacture of composite pigments by wet methods; however, the flocculation processes of the prior art are slow, selective (rather than indiscriminate) and incomplete. Accordingly, these processes are not well suited for the manufacture of composite pigments free of the effects of a detrimental selective flocculation and fractionation of the disperse phases, by species and size, manifested in serious performance deficiencies of the end products. As a matter of fact, many waterborne ultrafine colloidal systems cannot be flocculated (precipitated) at all with the use of the flocculating processes and agents and known in the prior art. In the applicant's diversified experimentation, however, no waterborne colloidal system has yet been encountered, regardless of how complex or difficult, able to resist the overpowering, instantaneous, indiscriminate and complete flocculating action of the in-situ-formed complex functional microgels used in practicing the present invention.

The secondary purpose of the complex functional microgels in question is to provide an arbitrary level of intrinsic cementation to the composite pigment aggregates. Since the above complex microgels are outstanding hydraulic cements in their own right, an adequate interparticle bonding can be established by merely aging the flocculated slurries, or cakes obtained by filtering these slurries, for a period ranging from a couple of hours to a few days. An important additional benefit of hydraulic curing is that the final particle-size distributions, called for by product specifications, can be obtained conveniently with the aid of inexpensive high-shear agitation. With furnishes containing, in addition to the principal pigmentary raw materials, organic dyes, carbon black and organic, cationically active chemical compounds with two or more reactive groups in each molecule, the flocculated slurries usually require filtration, drying and pulverization to obtain an adequate mechanical interity and the desired particle (aggregate)-size distributions.

The mechanical strength of $TiO_2$/extender aggregates is controlled primarily through the dosage of the hydraulically or thermally cured, in-situ-synthesized microgel cements. The curing is both faster and more complete at higher drying temperatures; however, precautions must be taken if temperature-sensitive organic components are built into the composite pigment. The mechanical strength of composite pigment aggregates can be yet further increased by coflocculating soluble or disperse adhesives with the pigmentary raw materi- als, enabling the aggregates to withstand even the most stringent shearing regimes encountered in practical end-use applications.

It should be pointed out that the adhesive action of the complex microgels is possible only because the microgel particles, formed in situ under the application of very high shearing forces, are extremely small and have an inherent deformability (prior to curing, of course), enabling them to orient themselves effectively in discrete, ultrathin formations embedded between the individual pigment particles to be cemented. As is obvious to those skilled in the art, only true microgel particles, but not solid aquasol particles or precipitates, are capable of such a deformation.

The tertiary purpose of the complex microgels in question is to impart various desirable material and functional properties to the aggregated and cemented pigment products, important from the standpoint of these products, end-use applications. The above effects can be realized through a modification of the inherent physical and/or surface-chemical properties of the above microgels, e.g., by chemically incorporating organic, cationically active compounds with at least two reactive groups in each molecule into the macromolecules which make up the microgels under discussion. As a consequence, a steric matrix of discrete organophilic (hydrophobic) sites can be imparted to composite pigments synthesized with the aid of the above complex microgels of a hybrid, inorganic/organic polymer-polycondensate type. By controlling, at will, the level of such organophilic (hydrophobic) properties, $TiO_2$-based composite pigments can be formulated amenable to an easy and uniform dispersion in organic media, rendering these pigments uniquely suited for such applications as filling of synthetic fibers and plastics or manufacturing of solvent-based lacquers and paints.

The in-situ-synthesized complex functional microgels can also be used as a tool for an indirect modification of the functional and surface-chemical properties of the resultant composite pigments under discussion since they make it possible to coflocculate, along with pigmentary constituents, such potent surface-chemical modifiers in their own right as emulsion polymers or organic dyes.

The principal reagents of commercial significance for the synthesis of the complex (multicomponent) functional microgels used in practicing the present invention are as follows:

(1) alkali-metal silicates and quaternary ammonium silicates, preferably sodium silicate; (2) alkali-metal aluminates, alkali-metal zincates and blends thereof in any proportions, preferably sodium aluminate; and (3) water-soluble, essentially colorless, bivalent and multivalent salts of calcium, magnesium, barium, aluminum, zinc, and zirconium, preferably calcium chloride or calcium nitrate.

The pH of flocculated pigment furnishes ranges usually from 8 to 12.5, depending to a large extent on the initial acidity of the process water employed. The use of aluminum sulfate, alone or in a combination with calcium chloride and/or other equivalent cross-linking salts, may be advantageous in such instances in which it is desirable to lower the acidity of the flocculated pigment furnish. In addition to, or instead of, aluminum sulfate, sulfuric acid and other common acidifying agents can also be used for the above purpose.

There is a great latitude with regard to the quantitative and qualitative compositions of the (intermediate) transient, chemically reactive, subcolloidal sodium-silico-aluminate or similar hydrosols and (final) complex microgels used in practicing the present invention, without detriment to their intended functions. For example, the acceptable ratio of sodium silicate to sodium aluminate, sodium silicate to sodium zincate, or sodium silicate to the combined mass of sodium aluminate and sodium zincate employed in forming the above subcolloidal hydrosols can be varied from 10:1 to 1:10, by weight. As was established in numerous experiments, a preferred ratio is 1:1.

The preferred concentration of sodium silicate in the reaction medium, i.e., pigment furnish, ranges from 0.1% to 2%, by weight, the same pertaining to concentrations of sodium aluminate, sodium zincate or combinations thereof. The use of reagent concentrations exceeding 2%, by weight, leads to an accelerated molecular-weight growth of sodium-silico-aluminate (zincate) macromolecules, reducing the latters' chemical reactivity toward the inorganic crosslinking salts. To sustain a sufficient level of this reactivity for synthesizing complex functional microgels with adequate flocculating and cementing properties, the transient subcolloidal hydrosols evolving from such concentrated reagent solutions should be cross-linked within a period of a few seconds, which, in turn, necessitates the use of special, powerful in-line mixers/reactors.

The ratio of calcium chloride or equivalent inorganic cross-linking salt(s) to the combined mass of the transient, chemically reactive subcolloidal hydrosols to be crosslinked can vary from 1:10 to 10:1, by weight, but the simple ratio of 1:1 was found to be most satisfactory for synthesizing in situ complex functional microgels with adequate flocculating and cementing efficacies. While the inorganic cross-linking salts can be used in proportions ranging from 0.5% to 10%, by weight, relative to the composite pigment mass, the amount of calcium or equivalent bivalent and multivalent ions present in the reaction medium should optimally exceed by at least 50% the quantity of such ions bound chemically by the above-mentioned transient subcolloidal hydrosols. As was determined by a chemical analysis of filtrates from complex microgels synthesized in pure water, the latter excess of cross-linking ions reduces the residual concentration of unreacted silicate and aluminate (zincate) molecules to just a few parts per million.

It should be emphasized that the formation of both the (intermediate) transient, chemically reactive subcolloidal sodium-silico-aluminate or similar hydrosols and the (final) complex functional microgels used in practicing the present invention are not stoichiometric. Identical transient subcolloidal hydrosols, as well as resultant complex microgels, are synthesized each time, however, when the same compositions, concentrations, proportions, dosages, rates and sequences of addition of the reagents and prescribed reaction conditions are maintained precisely during the synthesis process.

As is typical of ultrafast chemical reactions in aqueous media, the in-situ formation of complex functional microgels used in practicing the present invention is practically independent of the temperature of the reaction medium. The above microgels can thus be formed, in principle, within the entire temperature interval in which water remains fluid, provided that the stability of the reagents is not affected at elevated reaction temperatures. A special consideration, in particular, should be given to the limited thermal stability of solutions of sodium aluminate.

The above virtual independence of the synthesis process from thermal conditions and regimes is a unique feature of the above complex microgels, which becomes readily apparent when comparisons are made with the methods of preparation of even much simpler single-component or two-component colloidal systems, such as gels or aquasols (colloidal suspensions of solid particles) known in the prior art. For example, countless patents disclosing various methods of manufacturing pharmaceutical preparations, ion exchangers, catalysts and other products based on extraneously, or in-situ-prepared gels, aquasols or precipitates, sometimes of identical chemical compositions, often differ merely with respect to some seemingly minor, though critical to these end products' successful synthesis, variations in the thermal regimes.

The broad latitudes relative to concentrations and chemical compositions of the reagents, as well as reaction conditions, tolerable in synthesizing the complex functional microgels under discussion are indicative of the enormous potency of the general colloid-chemical system used in practicing the present invention. It is worth noting that similar latitudes are intolerable with analogous processes of the prior art, according to which even the simplest, single-component and two-component colloidal systems based on silica and alumino-silicates, respectively, must always be synthesized under rigorously maintained procedural and thermal regimes and strictly defined pH conditions in the reaction medium, as well as concentrations, proportions and types of reagents.

A still more detailed discussion of the subject matter of the above complex functional microgels is provided in the specification to the co-pending patent application Ser. No. 83/919,813 ("Functional Complex Microgels with Rapid Formation Kinetics"), Filed Jul. 27, 1992.

The principal concept at the foundation of the present invention, relying on a controlled coaggregation of particulate titanium dioxide and extender pigments, optionally also with other subpigmentary and nonpigmentary particulate materials and auxiliary water-soluble agents, is based on the following premises:

(1) Applicant's discovery of the favorable effect of the in-situ aggregation of very fine pigment fractions (pigment fines) on the light-scattering properties of the resultant aggregate formations, published in the previously mentioned article in *TAPPI Journal*, Vol. 53, No. 11, 1970.

(2) The experimental results of applicant's extensive research and development work pertaining to the scientific foundations of designing and synthesizing aggregate (composite) pigment products having both an increased optical-performance efficacy and novel functional properties.

(3) Vast amounts of technical information gathered from extensive laboratory and pilot-plant evaluations of a variety of plain (made of a single pigmentary raw material), as well as composite aggregate pigment products synthesized with the aid of the applicant's technology disclosed in U.S Pat. No. 5,116,418 and the co-pending patent applications Ser. No. 07/743,916 (Filed Aug. 12, 1991), and 07/775,025 (Filed Jul. 27, 1992.

(4) The inherent potential of the in-situ-synthesized complex functional microgels to instantaneously, indiscriminately and completely flocculate (coflocculate), and subsequently permanently cement, any and all particulate materials dispersed in an aqueous medium.

(5) Reasoning processes employing methods used in the philosophy of science.

In accordance with the latter reasoning processes, for example, titanium dioxide is considered a unique chemical substance, combining titanium and oxygen, as defined by criteria used in inorganic chemistry. Analogously, chemical compounds, such as kaolin clay, calcium carbonate, silica or calcium silicate, are also considered as being unique. Pigments, specifically the white (colorless) ones, on the other hand, represent merely a pragmatic class of materials equipped with certain typical, nonunique optical and end-use properties defined by conventions established in the trade. Hence, neither titanium dioxide nor any other particulate material is unique in any way when classified as pigments, the differences among them being purely quantitative.

As a consequence of the above, all pigments, primary and secondary, or blends thereof, must respond, in the same non-specific way, to an in-situ aggregation of pigment fines. It is the latter beneficial aggregation of fines, induced by the instantaneous, indiscriminate and complete flocculating action of the in-situ-synthesized complex functional microgels used in practicing the present invention, which is the principal mechanism responsible for the increased optical-performance efficacy of the resultant composite pigments.

A permanent immobilization of $TiO_2$ and extender particles relative to each other, as such, is another beneficial mechanism in the above regard, though less powerful than that based on the in-situ aggregation of pigment fines. The immobilization in question acts by preventing the detrimental fractionation and selective flocculation of $TiO_2$ and extender particles during end-use applications, such as are unavoidable with equivalent blends of loose pigments.

The concept of an effective interspacing of $TiO_2$ particles with oversized particles of low-refractive-index commercial extender pigments, as the primary mechanism responsible for the enhanced optical-performance efficacy of composite pigments of the extended-$TiO_2$ type, was fundamentally incorrect and is now all but refuted by contemporary pigment scientists.

It should be emphasized in the strongest possible terms that the above-sketched, seemingly elementary, working model of composite pigments of the extended-$TiO_2$ type, with demonstrably improved optical-performance efficacy relative to that of the equivalent blends of loose pigmentary ingredients, has not been presented heretofore by anybody else, to the best of the applicant's knowledge. The novelty of the above model should be even more underscored in that more than twenty years have passed since the beneficial effect of the in-situ aggregation of pigment fines on the light-scattering efficiency of pigmented formations was demonstrated by the applicant in the previously mentioned article in *TAPPI Journal*. Most importantly, however, the above model has not been arrived at in the prior art despite a vast pool of experts skilled in the art active for 72 years in the field of $TiO_2$ pigment research and development, in general and composite $TiO_2$-based pigments, in particular, in the scientifically and technologically highly advanced and rich-in-resources titanium dioxide pigment industry.

A laboratory synthesis of a high-optical-performance derivative composite pigment of the extended-$TiO_2$ type, containing a fine-particle-size calcined clay as the extender, is illustrated in the following example.

EXAMPLE I

A composite pigment made of a blend consisting of a commercial $TiO_2$ pigment, defined previously, and a standard commercial fine-particle-size calcined clay was prepared using a laboratory procedure intended to simulate the continuous synthesis process routinely employed in full-scale plant manufacturing operations. For the sake of simplicity, the proportions listed below were purposely scaled down to a starting mass of 100 g of pigmentary raw materials.

A batch of a well-dispersed 70%-solids slurry containing 40 g (dry weight) of a commercial $TiO_2$ pigment, was blended in a stainless steel beaker with a capacity of 800 cm$^3$ with a batch of a well-dispersed 50%-solids slurry containing 60 g (dry weight) of a fine-particle-size calcined clay. A powerful drill press equipped with a high-lift stirrer was employed to thoroughly homogenize the system ("pigment furnish") and, through a continuing intensive agitation, sustain dynamically a statistically uniform spatial distribution of all particulate furnish components. A predetermined amount of dilution water (see below) was introduced subsequently into the furnish, followed by an addition of 2 g (dry weight) of a polyacrylic-vinylacetate latex of the type commonly used in the paper industry.

Separate 5%-solids solutions of sodium silicate and sodium aluminate were injected, in the proportions of 2 g each (dry weight), into the agitated furnish with the aid of syringes placed at diametrically opposite sides of the beaker. After about 20 to 120 seconds from the moment of the injection of the above reagent solutions, a 5% solids solution of calcium chloride was injected, in the proportion of 4 g (dry weight), into the agitated system. The amount of dilution water was calculated so that the final solids of the flocculated pigment furnish were about 20%, by weight.

The instantly flocculated slurry Was aged from 2 to 12 hours before filtration and rinsing. The resultant filter cake was divided into two portions, one of which was dried, pulverized and made down into a well-dispersed 50%-solids slurry using a blend of 1%, by weight, of tetrasodium pyrophosphate and 0.5%, by weight, of Dispex N-40 (a polyacrylate compound) as dispersants, the latter process version being further referred to as the "dry" processing approach. In the other process version, further referred to as the "wet" processing approach, the remaining portion of the filter-cake was made down directly into a slurry, in the state "as is," relying solely on a hydraulic (instead of thermal) curing of the microgel cement, using the same dosages of the above-mentioned dispersants.

Since the yield of the complex functional microgel cement, synthesized in situ from the above-mentioned reagents used in the specified amounts and proportions, is about 63%, by weight, in the dry state (compared to about 50%, by weight, upon ashing), the approximate composition of the resultant composite pigment under discussion is, in terms of weight proportions, 37.4% $TiO_2$, 56.1% calcined clay, 1.9% latex and 4.7% microgel cement.

The composite pigment samples prepared by the dry and wet approaches differ with regard to the particle-size distribution, the thermally cured sample being coarser unless intensively comminuted.

As was established in extensive laboratory and pilot-plant evaluations, the best optical-performance efficacy is obtained, as a rule, when the largest aggregates present in composite pigments of the above-discussed type are only slightly larger than the coarsest particles present in the pigmentary raw materials employed. For example, when the calcined clay, as the coarser of the two pigmentary raw materials employed, is 98–100%, by weight, finer than 2 μm e.s.d., the composite pigment should be about 95–96%, by weight, finer than 2 μm e.s.d., meaning that the effective aggregation should encompass primarily the fine particle-size fractions of the pigmentary raw materials. An effective aggregation is understood above as one which endures the comminuting and shearing regimes employed in processing the "raw" composite pigments, to arrive at the particle-size distributions called for by end-product specifications.

The desired particle-size distributions can be obtained relatively easily with the composite pigments prepared by the wet route, by simply applying adequately high shearing forces during the course of slurry make down. On the other hand, a thorough comminution (precrushing and pulverization) is necessary with the composite pigments prepared by the dry route. Though the wet route is commercially more attractive, the dry route is often indispensable with the composite pigments containing auxiliary materials such as carbon black, organic dyes, microfibrils, non-film-forming emulsion polymers, and the like.

The light-scattering-coefficient values determined for the composite pigment prepared in Example I, the $TiO_2$ Control sample, and the loose blend consisting of 40% $TiO_2$ and 60% calcined clay, by weight, are listed in Table 1. The latter values ($s_{457}$ and $s_{577}$) were assessed with the aid of test procedures described by Kaliski in *TAPPI Journal*, Vol. 53, No. 11, 1970, Pages 2077–2084, using binderless films with a basis weight of 4 g/m$^2$, deposited from 50%-solids pigment slurries on optically flat black glass plates as coating substrates.

TABLE 1

| DETERMINATION | COMPOSITE PIGMENT | $TiO_2$ CONTROL | 40 $TiO_2$/ 60 CALC. CLAY |
|---|---|---|---|
| $s_{457}$, m$^2$/g | 0.43 | 0.43 | 0.38 |
| $s_{577}$, m$^2$/g | 0.35 | 0.31 | 0.29 |
| Rho, % | 81.4 | 72.1 | 76.3 |

As shown by the data in Table 1, the light-scattering coefficient of the composite pigment, containing only 37.4% $TiO_2$, determined at the wavelength of 457 nm, is equal to that of the $TiO_2$ Control (100% $TiO_2$) but considerably higher than that of the loose blend consisting of 40% $TiO_2$ and 60% calcined clay. At the longer light wavelength of 577 nm, the light-scattering coefficient of the composite pigment is significantly higher than that obtained with the $TiO_2$ Control, and even more significantly higher than that obtained with the loose blend of $TiO_2$ and calcined clay.

The above findings clearly point to exceptionally well-developed network of accessible, dimensionally well-balanced light-scattering sites present in coating films made of compaction-resisting composite-pigment aggregates. As is well understood by those skilled in the art, however, the abovementioned networks are but a secondary manifestation of the aggregate-pigment matrices, rich in intrinsically diversified fine structural features, resulting from the instantaneous instantaneous, indiscriminate and complete coflocculation of all particulates present in the furnish, effectively preventing the formation of densely packed, optically inefficient pigment aggregates.

A virtually inseparable side effect of the resultant bulky aggregate-pigment structures is a highly pronounced thixotropy of aqueous slurries of the above composite pigments, leading to a rapid setting (immobilization) of freshly applied coating films before a detrimental fractionation and flocculation of the particulate constituents, or the equally detrimental binder migration, can set in. However, even under such conditions under which a complete flocculation of a disperse system does take place, e.g., in paper filling, the preaggregated pigments (essentially devoid of pigment fines) resist the formation of densified, optically inefficient flocs, prevalent with nonaggregated pigments.

The development of progressively coarser coating or aggregate-pigment structures, as a function of the composition or morphology of pigmentary components, conditions of the aggregation process, coating-film parameters, and the like, can be uniquely monitored with the aid of the "Rho" parameter defined previously, calculated according to the following formula:

$$\rho[\%] = (s_{577} : s_{457}) \times 100$$

where $s_{577}$ and $s_{457}$ denote the light-scattering coefficients assessed at the indicated light wavelengths.

The Rho parameter is unique in assaying pigmented formations, both continuous and discrete, in that it is able to reveal, among other things, whether a purposeful or spontaneous coarsening of a coating, or aggregate-pigment structure, manifested by an increase of the Rho value, is beneficial, i.e., associated with an increase of the light-scattering coefficients, or detrimental, i.e., associated with a decrease of the latter. It should be borne in mind, however, that the overall coarsening effects assessed with the aid of the Rho parameter encompass both the "primary" coarsening effects, associated with the intrinsic aggregate (composite) pigment structure, as well as the "secondary" ones, associated with the coating structure itself.

As shown by the data in Table 1, the value of the Rho parameter, which was 72.1% for the $TiO_2$ Control, increased to 76.3%, as logically expected, when the latter pigment was blended with the relatively much coarser calcined clay. As was also anticipated accordingly, the light-scattering coefficients of coatings made from the loose $TiO_2$/calcined clay blend decreased at both of the above light wavelengths, both due to the "dilution" of the high-refractive-index material by the extender and the formation of densely packed (crowded) sites inaccessible to the impinging light waves, brought about by the slow, and pronouncedly selective flocculation of $TiO_2$ and calcined-clay particles.

In comparison, the light-scattering coefficients of the composite pigment are either equal to ($s_{457}$), or even higher than ($s_{577}$), those of the $TiO_2$ Control, clearly revealing that the composite pigment contains more of accessible light-scattering sites in the same pigment mass. Since the composite pigment in question is coarser than either of the two pigmentary raw materials from which it was synthesized, as indicated by the high Rho value of 81.4%, it is obvious that completely new light-scattering sites were created in the highly developed intrinsic aggregate structures, which are totally unlike the coarse, densified structures formed by an uncontrolled flocculation of loose $TiO_2$/calcined clay blends.

It should be qualified in the above context that the terms "coarse" or "coarsening" refer to dimensions on the order of only nanometers. Hence, for example, the blue light, with the shorter wavelength of 457 nm, will respond to a dimensional coarsening of the light-scattering sites (caused by the coarsening of the intrinsic structure of a coating film or pigment aggregate) by being scattered less efficiently while, accordingly, the green light, with the longer wavelength of 577 nm, will respond to the same coarsening by being scattered more efficiently. When the dimensional coarsening of the light-scattering sites progresses too far, however, both the blue and green light waves will be scattered less efficiently, causing a decrease of the numerical values of $s_{457}$ as well as $s_{577}$.

The Rho parameter, used in a combination with the corresponding light-scattering data, constitutes a powerful analytical tool for the evaluation of pigments and pigmented formations. For example, the $TiO_2$ (Control) pigment from Example I, having a relatively low Rho value of 72.1% and, at the same time, relatively high values of the light-scattering coefficients ($s_{457} = 0.43$ m$^2$/g and $s_{577} = 0.31$ m$^2$/g), can be classified as a pigmentary material with a very high level of optical-performance efficacy, but also some dimensional imbalance of the light-scattering sites favoring the shorter-light wavelengths. In comparison, the coating made of a loose blend consisting of $TiO_2$ and calcined clay has considerably lower values of the light-scattering coefficients ($s_{457} = 0.38$ m$^2$/g and $s_{577} = 0.29$ m$^2$/g) than those obtained with analogous $TiO_2$-Control coatings, indicative of fewer effective light-scattering sites being present in the resultant coating formation. On the other hand, the comparatively higher value of Rho, i.e., 76.3% vs. 72.1% for $TiO_2$, clearly indicates that the light-scattering sites are better balanced from a dimensional standpoint than those present in the analogous coating formations made of 100% $TiO_2$.

As indicated by the high values of both the light-scattering coefficients and Rho parameter, the composite pigment under discussion is, from the standpoint of optical-performance efficacy and dimensional balance of light-scattering sites, the best performer among the pigment systems listed in Table 1. The high numerical values of light-scattering coefficients obtained with the above composite pigment, despite its relatively coarse particle (aggregate) size, are generally indicative of a highly developed intrinsic structure of $TiO_2$-containing composite pigments of the present invention.

Considering both of the above findings, as well as related facts known in the prior art, the following becomes apparent:

(1) All commercial, disproportionately large relative to $TiO_2$, extender pigments (including calcined clay), qualify, at best, as "pseudo-spacers" and, in the case $TiO_2$-based composite pigments synthesized with the aid of the slow and selective flocculation processes of the prior art, have only a moderately beneficial $TiO_2$-extending action. With the exception of a more or less permanent, beneficial immobilization of $TiO_2$ and extender particles relative to each other, eliminating, or at least curtailing, a detrimental fractionation and selective flocculation of different pigmentary species in end-use applications, the pseudo-interspaced $TiC_2$-based composite pigments of the prior art have not surpassed the optical-performance efficacy of the equivalent blends of loose $TiO_2$ and extender pigments to any worthwhile extent, as is amply documented by industrial experience.

(2) While the customary particle-size distribution, typical of essentially all current $TiO_2$ (rutile and anatase) pigment products, may be preferable from the standpoint of contemporary $TiO_2$-manufacturing technology or the product's optical performance in the majority of commercial applications, it does not de facto ensure a most efficient utilization of the inherently high optical potential of this expensive material. The latter inefficiency pertains to both using $TiO_2$ directly, in the state "as is" (nonaggregated), in the customary end-use applications, and to employing the commercial $TiO_2$ pigments as raw materials for the manufacture of $TiO_2$-based composite pigments in accordance with the approaches known in the prior art.

(3) A controlled coaggregation of $TiO_2$ with conventional extenders, attained through an instantaneous, indiscriminate and complete flocculation of all particulate components by the in-situ-synthesized complex functional microgels, effectively "freezing" the dymanically maintained statistically uniform spatial distribution of all particulates present in the furnish, is capable of producing outwardly coarse aggregate structures intrinsically rich in dimensionally uniquely balanced light-scattering sites, providing a far more effective utilization of the expensive high-refractive-index $TiO_2$ component than was hitherto possible. Though the composite pigments under discussion, based on the use of commercial extenders, are obviously also pseudo-interspaced ones, the beneficial in-situ aggregation of pigment fines, including $TiO_2$ fines, makes a major contribution to the enhanced optical-performance efficacy of the resultant composite, intrinsically aggregated pigments.

While the facts specified in (1) are now rather clearly recognized in the art, it ought to be emphasized that the failure of contemporary $TiO_2$ pigment products to consistently provide high levels of optical-performance efficacy, referred to in (2) above, is fundamentally unavoidable as being inherently associated with the polydisperse character of $TiO_2$ pigments, in general, and the abundance of pigment fines, in particular. As previously indicated, the latter polydisperseity and the abundance of fines invariably lead to the development of densely packed, optically inefficient pigment formations (configurations).

The opacifying efficacy of the three pigment systems under discussion (the concept of opacity being relatively easier to visualize than the underlying light-scattering and light-absorption mechanisms) is illustrated by the data in Table 2, obtained with binderless coating films deposited on clear (transparent) mylar sheets as coating substrates.

TABLE 2

| SYSTEM | OPACITY, %, AT A COATING WEIGHT OF | | |
|---|---|---|---|
| | 5.0 g/m² | 8.14 g/m² | 10.0 g/m² |
| $TiO_2$ | 69.0 | 76.7 | 80.4 |
| 40 $TiO_2$/60 Calc. Clay | 67.8 | 74.1 | 75.9 |
| Composite Pigment | 69.8 | 78.2 | 81.3 |

The high opacifying efficacy of the composite pigment under discussion, clearly recognized from the data shown in Table 2, is especially noteworthy in that the latter pigment contains only about 37.4% $TiO_2$ and 56.1% calcined clay, the transparent latex and subpigmentary microgel cement hardly making any direct worthwhile contribution to that pigment's optical-performance efficacy.

The sterical model of the composite pigments described in Example I is that of a few co-existing aggregate types. The overwhelmingly predominant type is that of complex ensembles, occurring as separate entities (aggregates), in which a number of small congregations of $TiO_2$ particles spaced loosely relative to each other are coaggregated with, and cemented to, significantly larger, single calcined clay platelets (CCP) in accordance with the following schematic formula:

$\{[(TiO_2 \ldots TiO_2)_n]_m/CCP\}$ where n, m are integers and n>m.

The next most dominant aggregate configuration is represented by more complex sterical ensembles formed by coaggregation of two or more smaller ensembles, each of which, taken individually, is analogous to that symbolized above.

Because of the numerical predominance of the relatively small $TiO_2$ particles, independent aggregates of the latter, ensembled in doublets, triplets ... and so on, symbolized by the formula $(TiO_2 \ldots TiO_2)_a$, are also observed in electronphotomicrographs. Aggregates of intimately interspaced particles of $TiO_2$ and calcined-clay fines (CCF), on the other hand, symbolized by the formula $(TiO_2/CCF/TiO_2/ \ldots )_a$, occur relatively infrequently.

The above visual modelling of aggregate types demonstrates more clearly why, with the exception of the previously-mentioned in-situ-coprecipitated composite pigments, of course, the synthesis of all the other types of extended-$TiO_2$ composite pigments of the prior art, based on the concept of "interspacing" $TiO_2$ particles with particles of conventional extender pigments, is physically impossible. The latter impossibility is further supported by dimensional considerations indicating that the volume of a single average particle of a typical commercial extender is about 10 times larger than that of a single average $TiO_2$ particle with a diameter of 0.3 μm. The above dimensional discrepancy becomes amplified even more relative to yet larger extender particles and in view of particle anisometry prevalent with virtually all commercial extender pigments.

It is possible, however, to synthesize authentic interspaced $TiO_2$-based composite pigments with the methods used in practicing the present invention, by employing extraneous, thoroughly deagglomerated precipitated metal-silicate pigments as the extenders. Such commercial materials, mainly calcium silicates or alumino-silicates, sold in the form of highly aggregated particulates, are synthesized as ultrafine particulates with dimensions ranging from 0.01 to 0.03 μm. The freshly formed "elementary" ultrafine particles agglomerate rapidly into coarse ensembles whose equivalent spherical diameters frequently exceed 10 μm.

To deagglomerate the above-mentioned commercial metal silicates, the latter are blended with water to a solids level of up to 40-45%, which is about twice as high as the customary solids levels employed in practice. The resultant systems resemble initially a dry mass characterized by an extreme dilatancy. Exposed to a very-high-shear regime, e.g., kneading in a heavy-duty, enclosed sigma-blade mixer equipped with a cooling jacket, the shear-resisting structure breaks down, and the original dry mass converts into an easily manageable "wet" paste, which is a dispersion of water within a matrix of ultrafine metal-silicate particles deagglomerated to nearly their original dimensions of about 0.01-0.03 µm.

Of course, the deagglomerated particles reaggregate on aging, and stringent precautions must be maintained to preserve the mechanically enforced breakup of the original coarse aggregates. This is best accomplished, for example, by blending the deagglomerated paste at high shear with a concentrated $TiO_2$ slurry in the first step, diluting the resultant concentrated composite slurry with a predetermined amount of water in the second step, and promptly converting the diluted composite slurry (furnish) into an extended-$TiO_2$ composite pigment with the aid of the in-situ-synthesized complex functional microgels in the third step.

Using continuous plant-scale reactors, the entire synthesis process subsequent to the above-mentioned furnish dilution, encompassing the introduction of solutions of sodium silicate and sodium aluminate and cross-linking the resultant transient subcolloidal hydrosols with solutions of inorganic salts, can be carried out within a period extending from less than 20 seconds to about 2 minutes.

A yet more efficient deagglomeration of the metal-silicate extenders can be obtained by passing the above-mentioned $TiO_2$/metal-silicate slurry through comminution devices utilizing grinding balls. The action of the dedicated grinding balls, combined with a most efficient "microball"-grinding action of the relatively hard spherical $TiO_2$ particles, makes it possible to deagglomerate/comminute the metal-silicate particles to a size as small as 0.01 µm. Simultaneously, of course, one can also comminute the $TiO_2$ particles to any desirable size, e.g., 100%, by weight, finer than 0.9 µm to 0.3 µm, or even finer.

The extremely high degree of uniformity of spatial distribution of particulate components, obtained by intimately interspacing $TiO_2$ particles with properly deagglomerated ultrafine extender particles, can be best visualized by considering that, for example, in a composite pigment consisting of 40%, by weight, of $TiO_2$ particles with a diameter of about 0.2 µm, and 60%, by weight, of alumino-silicate extender particles with an equivalent spherical diameter of about 0.01 µm, each $TiO_2$ particle can be surrounded by a "cloud" of up to 20,000 extender particles.

The above intimate and uniform interspacing of $TiO_2$ particles with extender particles, so unsuccessfully attempted in the approaches of the prior art relying on the synthesis of derivative composite pigments from an extraneous $TiO_2$ and commercial (coarse) extenders, is ensured by the instantaneous, indiscriminate and complete flocculating action of the in-situ-synthesized complex functional microgels, used in practicing the present invention, and the exorbitant numbers of ultrafine particles participating in forming even the smallest aggregates.

Intrinsically interspaced extended-$TiO_2$ pigments with the above composition (40% $TiO_2$ and 60% ultrafine aluminosilicate) have already been synthesized in the laboratory using a conventional $TiO_2$ pigment, defined previously, and a mechanically deagglomerated commercial precipitated aluminosilicate extender as the raw materials. Although optically more efficient than analogous pseudo-interspaced composite pigments containing calcined clay, the $TiO_2$-based composite pigments made with the aid of ultrafine extenders can be made only into relatively dilute slurries, e.g., with solids levels not exceeding about 20-22%, by weight, because of highly pronounced thixotropy. These low solids, though perfectly suitable, or even preferable, for paper-filling and pigmented-size-press applications, limit the role of such thixotropic composite pigments in paper coatings and paints mainly to that of bulking and/or antisagging adjuvants.

It should be pointed out that the conventional latex adhesives, whose use, at a level of from 0.25% to 5%, by weight, is often necessary in the synthesis of $TiO_2$/-calcined clay composite pigments of the present invention, are usually too inefficient for use in analogous composite pigments containing the above-mentioned deagglomerated, ultrafine metal silicates. The reason for this is that most latexes used in the paper industry are too coarse, having particle diameters ranging from about 0.16-0.2 µm. To circumvent the above deficiency, a special class of polymer-emulsion adhesives was developed by the applicant, disclosed in the copending patent application Ser. No. 07/958,283 ("Ultrafine Polymer-Emulsion Adhesives for Microadhesion"), Filed Oct. 9, 1992, incorporated herein by reference. The latter adhesives have particle diameters smaller than 55 nm (0.055 µm) and glass-transition temperatures ranging from $-60°$ C. to $+20°$ C. For example, the number of particles contained in 1.6 g of such ultrafine polymer-emulsion adhesives, having an average particle diameter of about 40 nm, is slightly higher than that contained in 100 g of a conventional latex having an average particle diameter of 160 nm.

The following example demonstrates the application of the high-optical-performance composite pigment synthesized in Example I as a $TiO_2$ substitute in coating formulations for lightweight publication papers, used typically for illustrated weekly mass-circulation magazines.

EXAMPLE II

Two coating formuations were prepared at 60% solids, having compositions shown in Table 3.

TABLE 3

| FORMULATION INGREDIENTS | CONTROL FORMULATION WEIGHT-% | COMPOSITE PIGMENT FORMULATION WEIGHT-% |
|---|---|---|
| Delaminated Clay | 44 | 44 |
| No. 2 Coating Clay | 44 | 44 |
| Titanium Dioxide (loose) | 12 | — |
| Composite Pigment | — | 12 |
| Starch | 9 | 9 |

The above formulations were applied to a lightweight publication paper base sheet with a basis weight of 32 lbs. per 3300 ft$^2$ using a laboratory coating machine. The coated sheets were passed four times through a laboratory supercalender at 300 pli and 140° F. The data pertaining to the optical properties of the coated sheets in question are listed in Table 4.

TABLE 4

| SHEET PROPERTIES MEASURED | CONTROL FORMULATION | COMPOSITE PIGMENT FORMULATION |
|---|---|---|
| Ctg. Weight, lbs./3300 ft$^2$ | 5.8 | 5.8 |
| 75° Gloss, % | 36.9 | 39.6 |
| TAPPI Opacity, % | 88.6 | 88.6 |
| Brightness, % | 74.6 | 74.7 |

As shown by the data in Table 4, the optical properties of sheets coated with the above two formulations are identical for all practical purposes. The same pertains to the printing properties of the same coated sheets, such as smoothness, print gloss, optical density of prints and ink show-through, which were also found to be equal for both coating formulations under comparison.

The above example clearly demonstrates that the expensive $TiO_2$ pigment in the above-specified coating formulation can be replaced, on a one-for-one basis, with a $TiO_2$/calcined clay composite pigment containing only 37.4%, by weight, of the high-refractive-index material. Identical results were also obtained in many other tests and applications performed on commercial coaters, the $TiO_2$ pigment being replaced in its entirety by the above composite pigment. In those applications which require massive proportions of $TiO_2$, however, a one-for-one replacement may be limited to just a major portion of $TiO_2$ used in the formulation. An example of such an application is coating unbleached board with the aid of formulations whose pigmentation contains up to 45%, by weight, of loose $TiO_2$.

In addition to calcined clay and deagglomerated precipitated metal-silicates, mentioned previously, suitable extenders for use in synthesizing extended-$TiO_2$ composite pigments of the present invention encompass precipitated and water-ground calcium carbonate, precipitated calcium silicate and alumino-silicates in the state "as is" (i.e., nondeagglomerated), calcium sulfate, hydrated alumina, hydrated silica, hydrous kaolin clay and talcum. All above-mentioned extenders can be used as co-pigments for $TiO_2$ in proportions of from 5 to 95%, by weight.

Opacifying efficacies several times higher than that of $TiO_2$ have been obtained with extended-$TiO_2$ composite pigments of the type synthesized in Example I, also containing minute proportions of carbon black and/or nigrosine along with blue and red dyes. With many important paper products, such as newsprint and lightweight publication paper, the brightness requirements range from 58% to 72%, whereas the brightness of most commercial fillers ranges from 85% to 100%. It is a common practice in the art to tone down the higher-than-required sheet brightness, resulting from the use of the above-mentioned fillers, by adding carbon black and black dyes directly to the paper furnish. The latter approach is quite inefficient, however, a modest gain of sheet opacity frequently being outweighed by numerous detrimental side effects. In comparison, the composite pigments of the present invention, containing much smaller proportions of the same black dyes or carbon black built permanently into the aggregate structure, provide opacifying efficacies of magnitudes impossible to attain with any practically feasible combinations of loose $TiO_2$, extender pigments, carbon black and dyes.

As is well known to those skilled in the art, the highest levels of opacifying are obtained with the use of highly disperse carbon blacks. The diameters of so-called elementary particles of the finest contemporary carbon black products are equal to about 9 nm; however, even the best carbon black dispersions made in accordance with the prior art consist of multi-particle aggregates considered as further "undispersable." According to the paper industry's experience, carbon black used in the form of commercially available waterborne dispersions provides, pound for pound, from 100 to 150 times more opacifying power than $TiO_2$. On the other hand, analogous carbon black dispersions deagglomerated by the method described below, permanently incorporated into the extended-$TiO_2$ composite pigments of the present invention, provide from 2000 to 5000 times more opacifying power than $TiO_2$.

To attain the above level of opacifying efficacy, commercial aqueous dispersions of carbon black are deagglomerated by the "master-batch" method, referred to as such in the claims to follow, disclosed by the applicant in the previously mentioned U.S. Pat. No. 5,116,418. In accordance with the above method, waterborne carbon black dispersions are exposed to intensive shearing in concentrated aqueous pastes of subpigmentary particulates, such as deagglomerated precipitated metal silicates. Sigma-blade, or similar heavyduty high-shear mixers (kneaders), preferably equipped with cooling jackets, are well suited for the above purpose.

The resultant master batch, optimally containing 1-3%, by weight, of deagglomerated carbon black, is incorporated into the aggregate structure of the composite pigments under discussion, in essentially the same manner as any other particulate constituents, to attain net carbon-black levels of from 0.005% to 0.2%, by weight. It is necessary, however, to simultaneously incorporate up to 2 or 3% adhesives into the composite pigment structure, preferably the ultrafine polymer-emulsion adhesives with average particle diameters smaller than 55 nm, mentioned previously, as well as up to 0.2%, by weight, cationic polyelectrolytes added directly to the solutions of the inorganic cross-linking salts. Both latter materials significantly contribute to a complete immobilization of carbon black particles in the composite pigment structure, which is of critical importance in that a release of even traces of carbon black, e.g., amounting to only a couple parts per billion, is unacceptable in paper-mill practice.

The opacifying power of the extended-$TiO_2$ composite pigments of the present invention, containing carbon black deagglomerated by the above-described master-batch method, is illustrated in the following example:

EXAMPLE III

An extended-$TiO_2$ composite pigment was prepared using the procedure described in Example I, using raw materials in proportions of 40 g $TiO_2$, 60 g calcined clay, 0.12 g deagglomerated carbon black along with 11.88 g deagglomerated precipitated alumino-silicate (as a constituent of the carbon-black master batch), 2 g ultrafine polymer-emulsion adhesive (polybutylacrylate), 2 g sodium silicate, 2 g sodium aluminate, and 4 g calcium chloride, all weights referring to materials on an active basis.

The resultant composite pigment, containing 33.6% $TiO_2$, by weight, was used for filling laboratory handsheets, designated A-1 and A-2; analogous filled control handsheets, designated B-1 and B-2, were prepared using straight $TiO_2$. The measurement data pertaining to both sets of handsheets intended for saturation with melamine resin, obtained prior to and after the saturation, are listed in Table 5.

TABLE 5

| SHEET PROPERTIES MEASURED | SHEET DESIGNATION | | | |
|---|---|---|---|---|
|  | A-1 | A-2 | B-1 | B-2 |
| Basis Weight, lbs./3000 ft$^2$ | 54.2 | 54.8 | 54.3 | 57.0 |
| Filler Content, Wt-% | 37.2 | 37.5 | 42.0 | 40.1 |
| Lbs. $TiO_2$/3000 ft$^2$ | 6.7 | 6.9 | 22.8 | 22.9 |
| GE Brightness, % | 62.7 | 62.2 | 93.8 | 92.3 |

TABLE 5-continued

| SHEET PROPERTIES MEASURED | SHEET DESIGNATION | | | |
|---|---|---|---|---|
| | A-1 | A-2 | B-1 | B-2 |
| TAPPI Opacity, % Before Saturation | 99.6 | 99.0 | 97.2 | 96.5 |
| TAPPI Opacity, % After Saturation | 98.5 | 98.6 | 90.9 | 89.5 |
| Opacity Reduction Upon Saturation, %-point | 1.1 | 0.4 | 6.3 | 7.0 |

The data in Table 5 demonstrate both the enormous opacifying power of the carbon-black-containing composite pigment from Example III, and the unusually high level of retention of this opacifying power upon saturation with organic media. To fully appreciate the difference between a sheet opacity ranging from 99% to 99.6%, on the one hand, and 96.5% to 97.2%, on the other, the following demonstration will be helpful.

For example, a single handsheet having a basis weight of 61.1 lbs./3000 ft$^2$ and a TiO$_2$ content of 51.7%, by weight, (equivalent of 31.6 lbs./3000 ft$^2$) had an opacity of 98.38%. By folding the above sheet in two, a twin stack of sheets was obtained having an opacity of 99.44%. Hence, an opacity gain of a mere 1.06 percentage point was obtained by doubling the sheet's basis weight to 122.2 lbs./3000 ft$^2$ and the absolute TiO$_2$ content to 63.2 lbs./3000 ft$^2$. It is instructive to learn that the opacity gain obtained by tripling the handsheet in question was a only 0.1 percentage point above that obtained with the twin stack.

As is readily understood by those skilled in the art, the enormous opacifying power of the aggregate composite pigment from Example II is of utmost value in application to the manufacture of lightweight newsprint, for which the opacifying power of straight TiO$_2$ is too weak. It is estimated that about 1.5 to 2%, by weight, of the above filler is sufficient to render the opacity of a lightweight newsprint, e.g., with a basis weight of 26 lbs./3000 ft$^2$, equivalent to that of a standard newsprint with a basis weight of 30 lbs./3000 ft$^2$. Moreover, the brightness of a typical newsprint ranges from 58% to 62%; hence, the brightness of the above composite pigment, equal to about 63%, is fully adequate for newsprint filling.

A yet another type of TiO$_2$-containing, functional composite pigments of the present invention, uniquely suited for newsprinting applications, is synthesized by incorporating from 0.5% to 25%, by weight, of high-oil-absorption materials into the composite-pigment structure. The best such materials, effectively curtailing the undesirable ink strike-through and smearing typical of the contemporary lightweight newsprint papers, are, for example, bentonite, montmorillonite and synthetic, chemically treated calcium silicates, such as Hubersorb 600, absorbing up to 450 mg of oil per one gram of the particulate material. The latter materials should have very high specific surface areas, preferably in excess of 100 m$^2$/g, the largest particles being essentially 100%, by weight, finer than 5 $\mu$m e.s.d. It is worth pointing out that composite pigments containing high-oil-absorption materials are very thixotropic, which is overall beneficial for paper-filling applications.

The troublesome white and black pitch, forming in both the acidic and alkaline papermaking processes, can be eliminated readily with the aid of functional composite pigments of the present invention containing talcum. The latter material, whose largest particles should be essentially 100%, by weight, finer than 5 $\mu$m e.s.d., can be incorporated into the functional, pitch-combating composite filler-pigments in proportions of from 2% to 20% of the composite-pigment mass. Used primarily as an extender, however, talcum can be incorporated into the composite pigments in proportions of up to 95% of the aggregate-pigment mass.

Functional filler-pigments with the highest pitch-combating performance are obtained by incorporating from about 0.5% to 5%, by weight, of ultrafine (subpigmentary) talcum into the composite pigments of the present invention. The ultrafine talcum, having average particle dimensions of from 0.01 $\mu$m to 0.1 $\mu$m e.s.d., is obtained by an intensive comminution of commercial talcum.

As is well known to those skilled in the art, the traditional filler pigments, such as kaolin clay, calcined clay or even titanium dioxide, perform relatively better in the acidic papermaking process than in the alkaline one, for which the water-ground and precipitated calcium carbonates are the preferred filler materials. The likely reason for the latter performance difference is that the affinity of polymer chains of the high-molecular-weight retention agents used in the alkaline papermaking process is much higher in relation to the marginally soluble and chemically reactive (dissociating) calcium carbonate than to the chemically inert filer pigments used in the acidic process. It suffices, however, to build as little as 0.5-15%, by weight, of a pigmentary calcium carbonate, or up to 5%, by weight, of a subpigmentary precipitated and/or comminuted calcium carbonate into composite pigments containing a much less expensive kaolin clay or similar raw materials to impart to them adequate levels of affinity towards polymeric retention aids, thus rendering them more suitable as fillers for alkaline papermaking applications.

A vast improvement of first-pass filler retention efficiency, which is critical in the contemporary papermaking technology, can be obtained with the aid of composite pigments of the present invention containing from 0.1% to 2%, by weight, of synthetic and/or cellulosic microfibrils. The cellulosic microfibrils are prepared by a novel approach, referred to in the claims to follow as a "cascade microfibrilation process," disclosed in U.S. Pat. No. 5,240,561 ("Acid-to-Alkaline Papermaking Process"), incorporated herein by reference.

According to the above process, cellulosic fibers, derived preferably from cotton or well-defibrillating cellulosic pulps, are submitted to the following consecutive processing steps:

(a) dry or wet chopping of fibers to a length preventing hydraulic spinning in the subsequent wet refining operations, the chopped-fiber length in question being dependent on both the furnish solids and type of refining equipment;

(b) refining of chopped fibers resulting from step (a) at highest possible solids concentrations, e.g., of up to 30–35%, by weight, preferably in the presence of sodium silicate, Congo red and/or other inorganic or organic defibrillation-enhancing agents;

(c) additional refining of the system resulting from step (b) with the aid of centrifugal comminuters, exemplified by the well-known colloidal mills; and (d) finalizing the defibrillation attained in step (c) with the aid of Gmolin homogenizers, or equivalent equipment, in which the fibrous furnish is compressed at very high pressures and then rapidly decompressed by passing through a nozzle, causing the residual bundles of fibrils to "explosively" separate into individual microfibrils.

The optimum length of microfibrils applicable to the synthesis of the composite pigments of the present invention ranges from about 1 $\mu$m to 10 $\mu$m. Since neither cellulosic nor synthetic microfibrils adhere by themselves to inorganic pigments, conventional latexes or the previously mentioned ultrafine polymer-emulsion adhesives, and/or soluble adhesives, such as starch or polyvinyl alcohol, should simultaneously be employed in proportions ranging from 2% to 3% of the composite pigment mass.

Another important advantage offered by the extended-$TiO_2$ composite pigments of the present invention is that they can be made completely color neutral with the aid of as little as 0.001% to 0.01%, by weight, of corrective dyes (usually a combination of blue and red ones), to eliminate the residual yellow undertone inherent to all commercial $TiO_2$ and extender pigments. The corrective pigmentary (particulate) dyes are simply coflocculated with other particulate raw materials present in the pigment furnish, whereas soluble, ionically active dyes, preferably those of a cationic type, are built chemically into the macromolecules making up the complex functional microgel cements.

Using appropriately higher levels of color dyes, e.g., up to 5%, by weight, functional composite pigments can be synthesized suitable for a direct coloring of paper, nonwovens, paints, plastics or synthetic fibers. The use of the latter functional pigments is most economical, in that it totally eliminates the otherwise unavoidable separation of loose pigments and dyes in analogous applications carried out in accordance with the prior art. It should be pointed out, though, that up to 3–5%, by weight, of adhesives, preferably latex or polyvinyl alcohol, should simultaneously be employed in that the mechanical strength of the microgel cements can deteriorate perceptibly with high levels of organic dyes being incorporated into the composite pigments under discussion. It is also advantageous, from the standpoint of total dye immobilization, to add up to 0.2–0.5%, by weight, of the previously mentioned cationic polyelectrolytes directly into the solutions of the bivalent and multivalent inorganic cross-linking salts.

White composite pigments of the present invention are also suited, of course, for all applications in which $TiO_2$ pigments of the prior art are now routinely employed, additionally providing many valuable functional properties not attainable with the latter and always providing significantly better economy of use. One area of application deserving a special emphasis is the manufacture of high-gloss enamel paints and lacquers, using composite pigments under discussion synthesized from extra-fine $TiO_2$ particulates, defined previously as being essentially 100% finer, by weight, than from 0.3 $\mu$m to 0.9 $\mu$m.

Composite pigments synthesized from yet finer $TiO_2$ particulates, i.e., the ultrafine grades defined previously as being essentially 100%, by weight, finer than 0.2 $\mu$m, or even 0.1 $\mu$m, combined with ultrafine extenders, are uniquely suited as fillers for synthetic fibers and plastics in view of the antioxidant properties of ultrafine $TiO_2$.

While $TiO_2$ as well as mineral extender pigments are inherently hydrophilic, thus more or less difficult to use as fillers for synthetic fibers or plastics, arbitrary levels of organophilic properties can be imparted to the composite pigments of the present invention rendering them readily compatible with organic media. The organophilic properties in question are obtained with the aid of organic, cationically active chemical compounds with at least two reactive groups in each molecule added directly to the solutions of the inorganic bivalent and multivalent cross-linking salts employed in synthesizing the complex microgels used in making the composite pigments under discussion.

The above-mentioned organic, cationically active chemical compounds, capable of participating (along with the bivalent and multivalent inorganic salts) in cross-linking the transient chemically reactive subcolloidal sodium-silico-aluminate and similar hydrosols, are too numerous to list. The latter compounds can be selected readily, however, from three well-defined generic groups of chemicals, namely, cationic surface active agents, e.g., Hyamine2389 (methyl-dodecylbenzyl-trimethyl ammonium chloride-methyl-dodecylxylene bis[trimethyl ammonium chloride]); Werner complexes, e.g., Quilon M (a colorless bivalent organometallic complex in which a fatty acid is coordinated with aluminum); and cationic polyelectrolytes, e.g., polyacrylamides. These functional organics should be added sparingly to the solutions of the inorganic cross-linking salts employed, only to the extent needed to impart the desired levels of surface-chemical modification to the in-situ-synthesized complex functional microgels, hence, indirectly also to the resultant composite pigment products. It is important, however, to monitor the bonding strength of the evolving hybrid (inorganic/organic) complex microgels in that the latter strength deteriorates with the increasing level of the above cationic organic materials built chemically into the complex-microgel structure.

The organic, cationically active compounds in question are best screened with the aid of the contact angle method, which makes it possible to assess the required level of addition of the above materials to impart a proper level organophilic properties to composite pigments to make them compatible with arbitrary organic media. According to the present experimental findings, the above cationically active organic compounds are capable of a practically significant modification of surface-chemical properties of the resultant composite pigments if used in proportions amounting to only 0.001% to 0.005%, by weight, of the composite-pigment mass. A strongly pronounced surface-chemical modification of composite pigments can be obtained with only slightly higher levels of the organic, cationically active materials built into the complex microgels, a level of 0.5%, in relation to the composite-pigment mass, being the practical limit.

Another type of functional composite pigment of the present invention, having controlled levels of organophilic properties, can be obtained by incorporating from 0.25% to 5%, by weight, of organic, non-film-forming spherical particulates into the composite-pigment structure. The organic particulates in question, encompassing pigmentary, high-glass-transition-temperature polystyrene and polyacrylates with average particle diameters ranging from about 0.15 $\mu$m to 0.5 $\mu$m, impart very favorable ink-receptivity and ink-vehicle-dissipation characteristics to the composite pigments under discussion, also enhancing the penetration of organic liquids (saturation) into papers filled with such composite pigments. Used in proportions of up to 20% of the composite-pigment mass, the above organic particulates can make also a significant contribution to the optical-performance efficacy of the resultant composite pigments.

Still another type of functional composite pigment of the present invention, imparting extra-high levels of ink receptivity to paper coatings containing these pigments, is obtained by incorporating from 0.25% to 5%, by weight, of ultrafine non-film-forming spherical polystyrene particles with an average diameter of about 0.03 μm, sold under the commercial name of Lytron 603, into the composite-pigment structure.

While certain preferred practices and embodiments of the present invention have been set forth in the foregoing specification, it is understood by those skilled in the art that other variations and modifications may be employed within the scope of the teachings of the present invention. The detailed description is, therefore, not to be taken in a limiting sense, and the scope of the present invention is best defined by the claims to follow.

What is claimed is:

1. Composite pigment products comprising from 4.5% up to 50%, by weight, of at least one particulate titanium dioxide; from 5% to 95%, by weight, of at least one low-refractive-index pigmentary extender; and from 0.5% to 10%, by weight, as determined by ashing, of an in-situ synthesized complex functional microgel cement, wherein the constituents of said microgel cements are:
   (a) from 0.5% to 10%, in relation to the total mass of said composite pigment, of a transient, chemically reactive subcolloidal hydrosol formed of
      (1) at least one reagent selected from the group consisting of alkali-metal silicates and quaternary ammonium silicates; and
      (2) at least one reagent selected from the group consisting of alkali-metal aluminates and alkali-metal zincates, the ratio of the reagents of (1) to the reagents of (2) being from 1:10 to 10:1, by weight;
   cross-linked by
   (b) at least one gel-setting agent selected from the group consisting of bivalent and multivalent inorganic salts in an amount of from 0.5% to 10%, by weight, in relation to the total mass to said composite pigment, and, optionally, at least one organic, cationically active chemical compound with two or more reactive groups in each molecule in an amount of from 0.001% to 0.5%, by weight, in relation to the total mass of said composite pigment, the ratio of said gel-setting agents to said chemically reactive, subcolloidal hydrosol ranging from 1:10 to 10:1 by weight.

2. Composite pigment products according to claim 1, additionally comprising at least one of the following materials:
   (a) from 0.5% to 95%, by weight, of at least one mineral particulate subpigmentary material;
   (b) from 0.5% to 25%, by weight, of at least one particulate high-oil-absorption material with a specific surface area larger than 100 m²/g;
   (c) from 0.25% to 20%, by weight, of at least one organic, particulate non-film-forming material;
   (d) from 0.25% to 5%, by weight, of at least one adhesive selected from the group consisting of organic polymer-emulsion adhesives and water-soluble polymer adhesives;
   (e) from 0.001% to 0.5%, by weight, of at least one organic, cationically active chemical compound with at least two reactive groups in each molecule;
   (f) from 0.005% to 5%, by weight, of at least one color dye;
   (g) from 0.005% to 0.2%, by weight, of carbon black; and
   (h) from 0.1% to 2%, by weight, of at least one microfibrils.

3. Composite pigment products according to claim 1, wherein said at least one particulate titanium dioxide is selected from the group consisting of
   (a) titanium dioxide pigments having essentially 100%, by weight, of particles finer than 1.5 μm, 98–99% finer than 1 μm, and 35–50% finer than 0.3 μm, in diameter;
   (b) extra-fine pigmentary titanium dioxide derived from titanium dioxide pigments by a comminution to a particle size essentially 100%, by weight, finer than from 0.3 μm to 0.9 μm in diameter;
   (c) borderline pigmentary titanium dioxide derived from titanium dioxide pigments by a comminution to an essentially monodisperse particle population with a representative diameter of about 0.2 μm; and
   (d) ultrafine, subpigmentary titanium dioxide derived from titanium-dioxide pigments by a comminution to a particle size essentially 100%, by weight, finer than 0.1 μm in diameter.

4. Composite pigment products according to claim 1, wherein said at least one pigmentary extender is selected from the group consisting of calcined clay, kaolin clay, talcum, water-ground calcium carbonate, precipitated calcium carbonate, precipitated calcium silicate, precipitated calcium sulfate, precipitated hydrated alumina, precipitated hydrated silica and precipitated alumino-silicates.

5. Composite pigment products according to either of claims 1 or 2, wherein said at least one bivalent and multivalent inorganic cross-linking salt is selected from the group consisting of colorless salts of calcium, magnesium, barium, aluminum, zinc and zirconium.

6. Composite pigment products according to either of claims 1 or 2, wherein said at least one organic, cationically active chemical compound with at least two reactive groups in each molecule is selected from the group consisting of cationic surfactants, organometallic Werner complexes, and cationic polyelectrolytes.

7. Composite pigment products according to claim 2, wherein said at least one mineral subpigmentary material is selected from the group consisting of precipitated ultrafine calcium carbonates, mechanically deagglomerated precipitated calcium silicates, mechanically deagglomerated precipitated alumino-silicates and intensively comminuted talcum.

8. Composite pigment products according to claim 2, wherein said at least one particulate high-oil-absorption material with a specific surface area larger than 100 m²/g is selected from the group consisting of montmorillonite, bentonite and synthetic absorbent grades of calcium silicates.

9. Composite pigment products according to claim 2, wherein said at least one organic, particulate non-film-forming material is selected from the group consisting of spherical polyacrylics and spherical polystyrene, having particle diameters ranging from 0.03 μm to 0.5 μm.

10. Composite pigment products according to claim 2, wherein said at least one organic polymer-emulsion adhesive is selected from the group consisting of conventional latex adhesives having particle diameters larger than 70 nm and ultrafine polymer-emulsion adhesives having particle diameters finer than 55 nm and glass-transition temperatures ranging from −60° C. to +20° C.

11. Composite pigment products according to claim 2, wherein said at least one water-soluble organic polymer adhesive is selected from the group consisting of starch and polyvinyl alcohol.

12. Composite pigment products according to claim 2, wherein said at least one color dye is selected from the group consisting of organic and inorganic particulate dyes and organic, ionically active water-soluble dyes.

13. Composite pigment products according to claim 2, wherein said carbon black is prepared by the masterbatch method employing a mechanical deagglomeration of naturally aggregated carbon-black particles in concentrated pastes of subpigmentary mineral particles.

14. Composite pigment products according to claim 2, wherein said at least one microfibril is selected from the group consisting of synthetic microfibrils, and cellulosic microfibrils with the length of up to 10 μm, said cellulosic microfibrills being obtained by a multistage de-fibrillation of cellulosic fibers, comprising the steps of:

(a) chopping of the fibers to a length preventing hydraulic spinning in the subsequent refining operations;

(b) refining of fibers from step (a) at solids concentrations of up to 30–35%, by weight;

(c) additional refining of fibers from step (b) with the aid of centrifugal comminutors; and (d) finalizing the defibrillation obtained in step (c) with the aid of homogenizers, in which the fibrous furnish is compressed at very high pressures and then rapidly decompressed by passing through a nozzle, causing the residual bundles of fibrils to explosively separate into individual microfibrils.

* * * * *